United States Patent
Kato

(10) Patent No.: US 11,076,068 B2
(45) Date of Patent: *Jul. 27, 2021

(54) IMAGE PROCESSING APPARATUS, IMAGE PROCESSING SYSTEM, AND CONTROL METHOD FOR ACTIVATING AN APPLICATION THEREIN

(71) Applicant: TOSHIBA TEC KABUSHIKI KAISHA, Tokyo (JP)

(72) Inventor: Hiroyuki Kato, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,930

(22) Filed: May 18, 2020

(65) Prior Publication Data

US 2020/0280650 A1 Sep. 3, 2020

Related U.S. Application Data

(63) Continuation of application No. 16/370,840, filed on Mar. 29, 2019, now Pat. No. 10,701,236.

(30) Foreign Application Priority Data

Jul. 26, 2018 (JP) .............................. JP2018-139926

(51) Int. Cl.
*H04N 1/32* (2006.01)
*H04N 1/00* (2006.01)

(52) U.S. Cl.
CPC ..... *H04N 1/32106* (2013.01); *H04N 1/00411* (2013.01); *H04N 1/00482* (2013.01); *H04N 1/32363* (2013.01); *H04N 2201/0094* (2013.01)

(58) Field of Classification Search
CPC .......... H04N 1/32106; H04N 1/00411; H04N 1/00482; H04N 1/32363; H04N 2201/0094; H04N 1/34; H04N 1/348; H04N 1/346; H04N 1/00204; H04N 1/00474; H04N 1/00962; G06F 3/0321; G06F 3/03545; G06F 2203/0337; G06F 16/951;

(Continued)

(56) References Cited

U.S. PATENT DOCUMENTS

| | | | |
|---|---|---|---|
| 5,282,127 A | | 1/1994 | Mii |
| 5,892,900 A | * | 4/1999 | Ginter .................... G06Q 20/12 726/26 |

(Continued)

FOREIGN PATENT DOCUMENTS

| | | |
|---|---|---|
| EP | 1953599 A1 | 8/2008 |
| JP | 2012-22517 A | 2/2012 |

(Continued)

OTHER PUBLICATIONS

Extended European Search Report dated Dec. 20, 2019 in corresponding European Patent Application No. 19187238.1, 10 pages.

*Primary Examiner* — Negussie Worku
(74) *Attorney, Agent, or Firm* — Kim & Stewart LLP

(57) ABSTRACT

An image processing apparatus includes a storage unit in which a usage quantity of each of the functions is stored, and a processor configured to control activation of the application, based on the usage quantity of the function employed by the application.

19 Claims, 18 Drawing Sheets

(58) Field of Classification Search
CPC ............. G06F 3/04845; G06F 3/04883; G06F 40/171; G06F 40/174; G06F 21/629; G06F 2221/2141; G06F 21/105; G06F 21/44; G06F 16/332; G06F 16/3331; G06F 16/381; G06F 16/9554; G06F 3/033; G06F 1/1626; G06F 21/121; G06F 2200/1632; G06F 3/0362; G06F 3/0481; G06F 3/0482; G06F 3/0485; G06F 3/0488; G06F 16/50; G06F 19/321; G06F 21/608; G06F 2209/482; G06F 3/0227; G06F 3/04842; G06F 3/1205; G06F 3/126; G06F 3/147; G06F 3/167; G06F 8/65; G06F 9/485
USPC ........................................................ 358/471
See application file for complete search history.

(56) References Cited

U.S. PATENT DOCUMENTS

| | | | |
|---|---|---|---|
| 5,917,912 A * | 6/1999 | Ginter .................... G06Q 20/02 | 713/187 |
| 9,110,685 B2 * | 8/2015 | Suryanarayana ......... G06F 8/65 | |
| 9,426,650 B2 * | 8/2016 | Bangole .................. H04W 4/46 | |
| 9,578,104 B2 * | 2/2017 | Bangole ................ H04L 63/062 | |
| 10,003,709 B1 | 6/2018 | Kato | |
| 10,701,236 B2 * | 6/2020 | Kato .................... H04N 1/00411 | |
| 2005/0128515 A1 | 6/2005 | Ohno | |
| 2007/0236721 A1 | 10/2007 | Okamoto | |
| 2010/0058482 A1 * | 3/2010 | Nagumo .............. G06Q 50/184 | 726/26 |
| 2011/0066721 A1 | 3/2011 | Shinomiya | |
| 2011/0066886 A1 * | 3/2011 | Sugiura .................... G06F 21/10 | 714/16 |
| 2012/0096378 A1 | 4/2012 | Kato | |
| 2012/0194836 A1 | 8/2012 | Uchida | |
| 2012/0257240 A1 * | 10/2012 | Yuki ..................... G06F 21/608 | 358/1.14 |
| 2013/0057882 A1 * | 3/2013 | Ohta ..................... G06F 3/1291 | 358/1.9 |
| 2013/0057896 A1 * | 3/2013 | Ito ....................... G06K 15/4095 | 358/1.14 |
| 2013/0057917 A1 | 3/2013 | Ohta | |
| 2013/0159992 A1 | 6/2013 | Nuggehalli et al. | |
| 2016/0104016 A1 | 4/2016 | Deal et al. | |
| 2016/0104017 A1 | 4/2016 | Deal et al. | |
| 2016/0342301 A1 | 11/2016 | Kato et al. | |
| 2016/0366293 A1 | 12/2016 | Ono | |
| 2017/0013146 A1 | 1/2017 | Okuno | |
| 2017/0019551 A1 * | 1/2017 | Ge ..................... H04N 1/00941 | |
| 2017/0150003 A1 | 5/2017 | Odagiri | |
| 2017/0366701 A1 | 12/2017 | Ooba | |
| 2018/0039787 A1 * | 2/2018 | Watariuchi ............ H04L 63/062 | |
| 2018/0159999 A1 | 6/2018 | Ito | |
| 2018/0376012 A1 | 12/2018 | Kato | |
| 2019/0098177 A1 | 3/2019 | Yoshida | |
| 2019/0141206 A1 | 5/2019 | Tomita et al. | |
| 2019/0199877 A1 | 6/2019 | Kato | |

FOREIGN PATENT DOCUMENTS

| | | |
|---|---|---|
| JP | 2014-164392 A | 9/2014 |
| JP | 2015-222549 A | 12/2015 |

* cited by examiner

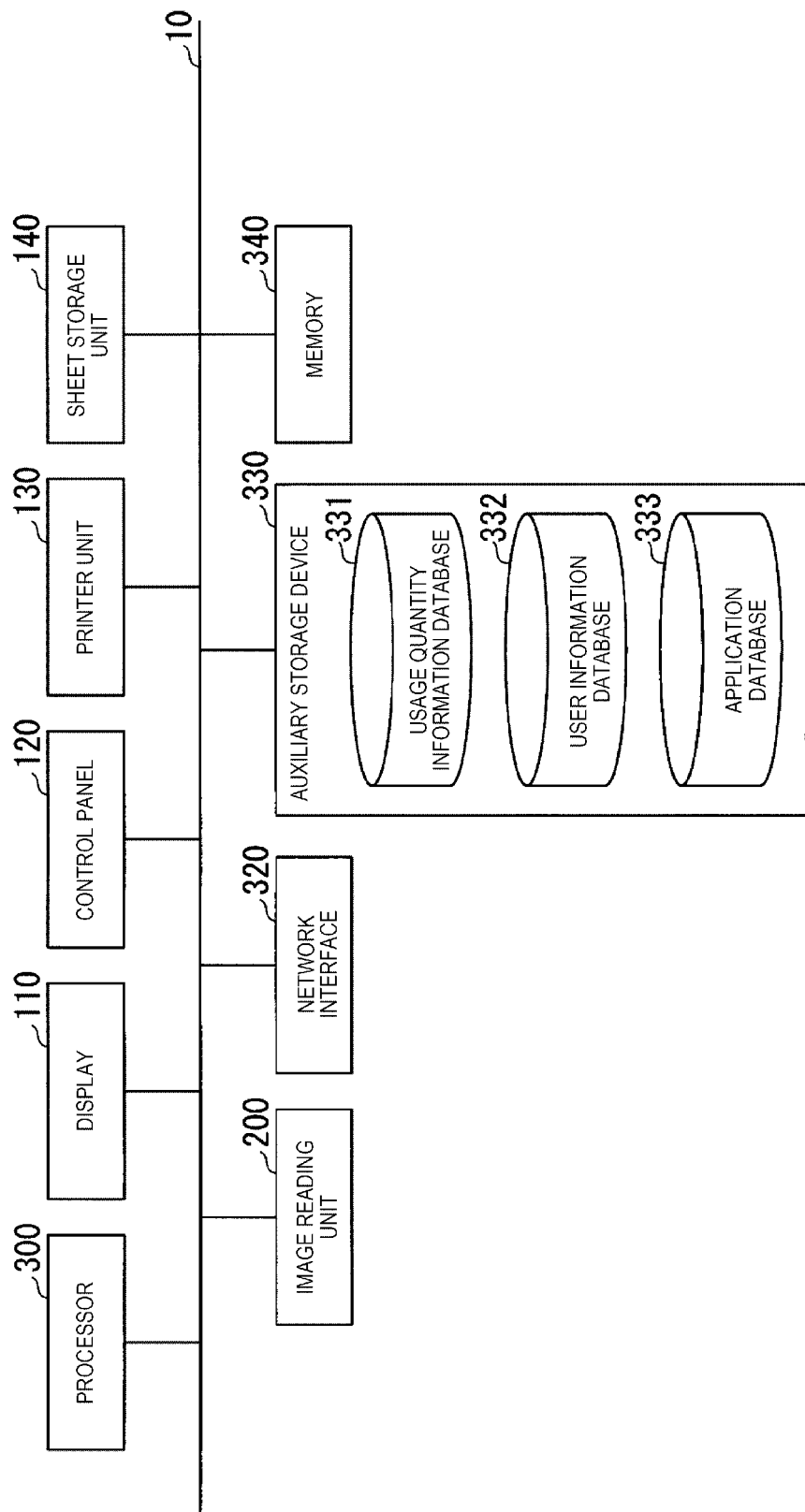

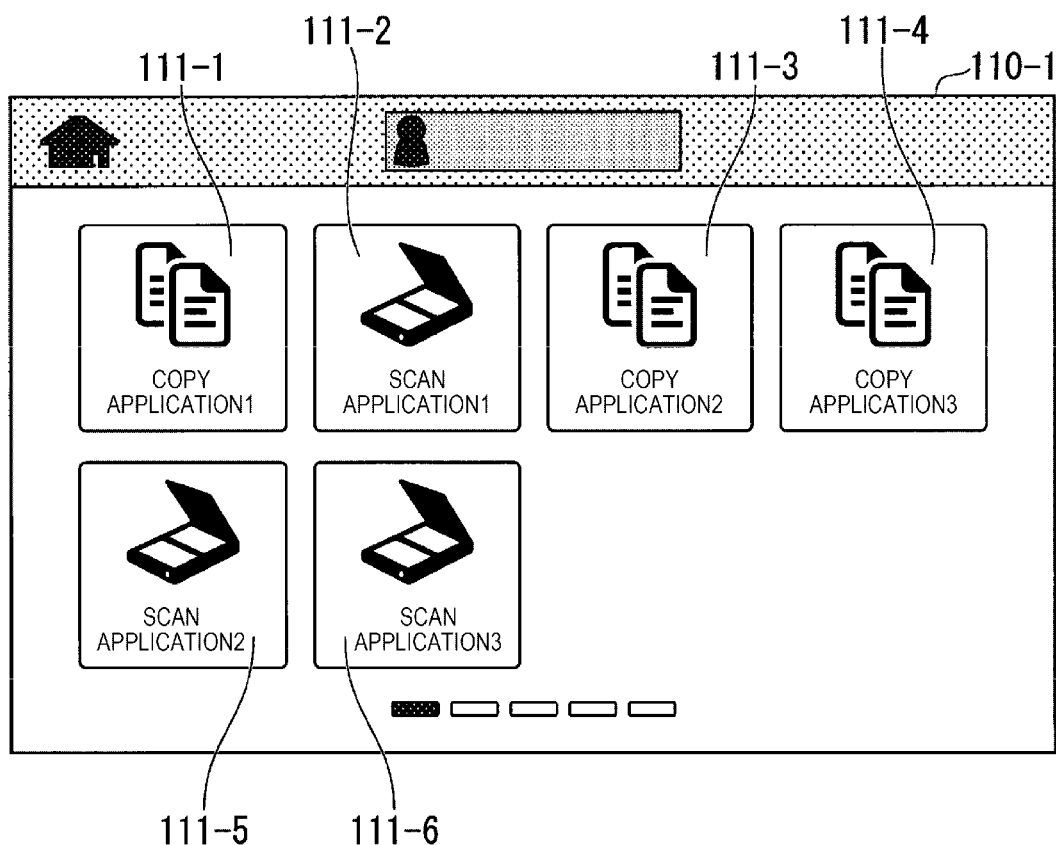

FIG. 5

```xml
<?xml version="1.0" encoding="UTF-8"?>
<AppProperties xmlns="http://www.xxxxxxxxx.co.jp/xxxx/package">
    <AppId>aaaaaaaa-bbbb-cccc-dddd-123456789012</AppId>
    <AppName>Copy-App</AppName>
    <AppVersion>1.0</AppVersion>
    <AppCreatedDate>2017-07-17</AppCreatedDate>
    <AppSummary>Copy-embedded-MFP-application</AppSummary>
    <AppButtonName1>Copy-Application</AppButtonName1>
    <AppButtonName2></AppButtonName2>

<SupportsTrialByUsedAmount>True</SupportsTrialByUsedAmount>
    <SupportsTrialPerUser>True</SupportsTrialPerUser>
    <TrialAmount>
        <Copy>100</Copy>
        <Scan>50</Scan>
        <Print>80</Print>
        <FaxSend>10</FaxSend>
    </TrialAmount>
</AppProperties>
```

| | | USAGE QUANTITY | | | |
|---|---|---|---|---|---|
| | | USER 1 | USER 2 | USER 3 | TOTAL |
| MFP FUNCTION | COPY | 10 | 1 | 2 | 13 |
| | SCAN | 3 | 50 | 7 | 60 |
| | PRINT | 7 | 6 | 80 | 93 |
| | FAX TRANSMISSION | 4 | 0 | 0 | 4 |

FIG. 14

|  |  | USAGE QUANTITY | | | |
|---|---|---|---|---|---|
|  |  | USER 1 | USER 2 | USER 3 | TOTAL |
| MFP FUNCTION | COPY | 10 | 1 | 2 | 13 |
|  | SCAN | 3 | 50 | 7 | 60 |
|  | PRINT | 7 | 6 | 80 | 93 |
|  | FAX TRANSMISSION | 4 | 0 | 0 | 4 |
| APPLICATION | APPLICATION A | 5 | 6 | 7 | 18 |
|  | APPLICATION B | 3 | 0 | 7 | 10 |

331c

IMAGE PROCESSING APPARATUS, IMAGE PROCESSING SYSTEM, AND CONTROL METHOD FOR ACTIVATING AN APPLICATION THEREIN

CROSS-REFERENCE TO RELATED APPLICATION

This application is a continuation of U.S. patent application Ser. No. 16/370,840, filed Mar. 29, 2019, which application is based upon and claims the benefit of priority from Japanese Patent Application No. 2018-139926, filed Jul. 26, 2018, the entire contents of which are incorporated herein by reference.

FIELD

Embodiments described herein relate generally to an image processing apparatus, an image processing system, and a control method for activating an application therein.

BACKGROUND

In the related art, there is a trial period in which an application program (hereinafter, referred to as "application") can be used on a trial basis in a multi-function peripheral (MFP). A user can use the application during the trial period even without a valid license. Herein, validity of a license means that a license has been purchased and activated. However, in the related art, even if the application is not used during the trial period, if the trial period elapses, the application cannot be used. Accordingly, in some cases, the application may not even be used during the trial period.

DESCRIPTION OF THE DRAWINGS

FIG. 2 is a block diagram illustrating a hardware configuration.

FIG. 3 is a diagram illustrating a display example.

FIG. 4 is a diagram illustrating a specific example of a usage quantity information database.

FIG. 5 is a diagram illustrating an example of metadata setting of an application.

FIG. 14 is a diagram illustrating a specific example of a usage quantity information database according to a fourth embodiment.

DETAILED DESCRIPTION

Embodiments provide an image processing apparatus, an image processing system, and a control method for activating an application therein.

An image processing apparatus according to an embodiment includes a storage unit in which a usage quantity of each of the functions is stored, and a processor configured to control activation of the application, based on the usage quantity of the function employed by the application.

Hereinafter, an image processing apparatus, an image processing system, and a control method for activating application therein, according to an embodiment, will be described with reference to the drawings.

First Embodiment

Figure 1:
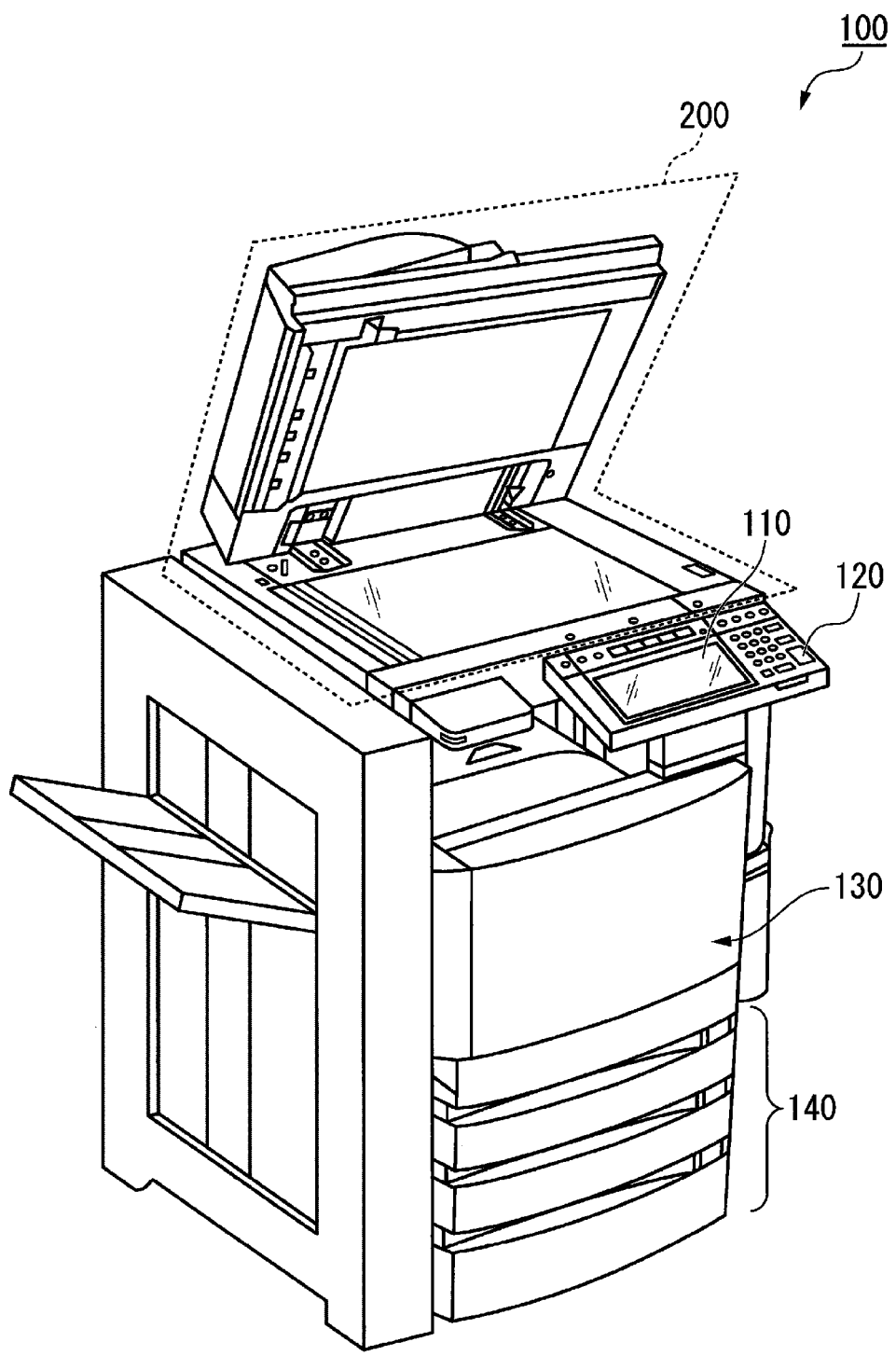
FIG. 1 is an external view illustrating an overall configuration example of an image processing apparatus according to a first embodiment.

FIG. 1 is an external view illustrating an overall configuration example of an image processing apparatus 100 according to a first embodiment. The image processing apparatus 100 according to the embodiment is a multifunction printer capable of forming a toner image on a sheet. The sheet is, for example, an original document, paper on which an image is formed. The sheet may be anything as long as the image processing apparatus 100 can read the image formed thereon. The image processing apparatus 100 reads an image on a sheet, generates digital data, and generates an image file.

After an application is installed, the image processing apparatus 100 displays an execution instruction image of the installed application on a screen of a display. The execution instruction image is an image displayed on the screen of the display which a user selects to instruct execution of the application. Hereinafter, a case where the execution instruction image is an application button will be described as an example. The image processing apparatus 100 controls activation of an application depending on whether or not a usage quantity of an MFP function employed by the application exceeds an upper limit value. An MFP function is any function which can be performed by the MFP, and is, for example, a copy function, a scan function, a print function, and a facsimile transmission function. The MFP function is not limited to this, and any other functions that can be performed by the MFP are included. The usage quantity may be the number of sheets used by the MFP function or may be the number of times of use of the MFP function. In the following description, a case where the usage quantity is the number of sheets will be described as an example.

The image processing apparatus 100 includes a display 110, a control panel 120, a printer unit 130, a sheet storage unit 140, and an image reading unit 200.

The display 110 is a display device such as a liquid crystal display or an organic electro luminescence (EL) display. The display 110 displays various kinds of information on the image processing apparatus 100. In addition, the display 110 is configured to receive an operation input of a user and outputs a signal corresponding to an operation performed by the user to a processor of the image processing apparatus 100.

The control panel 120 includes a plurality of buttons. The control panel 120 receives the operation input of the user. The control panel 120 outputs a signal corresponding to the operation performed by the user to the processor of the image processing apparatus 100. The display 110 and the control panel 120 may be configured as an integrated touch panel.

The printer unit 130 is an image forming device that performs image formation processing. In the image formation processing, the printer unit 130 forms an image on a sheet based on image information generated by the image reading unit 200 or image information received via a communication path.

The sheet storage unit 140 is a sheet tray that stores a sheet used for image formation of the printer unit 130.

The image reading unit 200 includes a scanner and reads an image according to lightness and darkness of the image. For example, the image reading unit 200 reads an image printed on the sheet to be read set on a document reading table. The image reading unit 200 records the read image data. The recorded image data may be transmitted to another information processing device via a network. The recorded image data may be formed on the sheet by the printer unit 130.

FIG. 2 is a block diagram illustrating a hardware components of the image processing apparatus 100 according to the first embodiment.

The image processing apparatus 100 includes the display 110, the control panel 120, the printer unit 130, the sheet storage unit 140, the image reading unit 200, a processor 300, a network interface 320, an auxiliary storage device 330, and a memory 340. The display 110, the control panel 120, the printer unit 130, the sheet storage unit 140, and the image reading unit 200 are described above. Hereinafter, the processor 300, the network interface 320, the auxiliary storage device 330, and the memory 340 will be described. Each of the components is connected to a system bus 10 so as to enable data communication between them.

The processor 300 is, for example, a processor such as a central processing unit (CPU). The processor 300 controls an operation of each component of the image processing apparatus 100. The processor 300 performs various kinds of processing by executing a program.

The network interface 320 performs data communication with other devices. Here, the other devices include an information processing device such as a personal computer. The network interface 320 operates as an input interface and receives data or instructions transmitted from other devices. The instructions transmitted from other devices are an instruction to perform printing, and the like. In addition, the network interface 320 operates as an output interface and transmits data to other devices.

The auxiliary storage device 330 is, for example, a hard disk or a solid state drive (SSD) and stores various data. The various data is, for example, digital data, a job, a job log, a usage quantity information database 331, a user information database 332, and an application database 333.

The usage quantity information database 331 stores information on a usage quantity of an MFP function employed by an application for each user.

The user information database 332 stores user information. The user information includes user identification information for identifying a user or an administrator, and user attribute of each user. The user attribute includes an authority that the user has. The authority includes, for example, a copy implementation authority, a scan implementation authority, a print implementation authority, and a FAX transmission implementation authority.

The application database 333 stores an application package and license information. The application package includes application identification information, application metadata, an application program, data referred to by an application, application button image identification information, an application button image specified by the application button image identification information, and an application button name. The application identification information may be included in the application metadata or the application program. The application button name may be included in metadata. The application package may include a plurality of application button images having different display sizes. In addition, the license information is information on a license of the application. The license information includes, for example, application identification information of an application requiring a license and valid information indicating whether or not the license is valid.

The memory 340 is, for example, a random access memory (RAM). The memory 340 temporarily stores data used by each component of the image processing apparatus 100. The memory 340 may store the digital data generated by the image reading unit 200. The memory 340 may temporarily store a job and a job log.

FIG. 3 is a diagram illustrating a display example of the display 110. A plurality of application buttons 111-1 to 111-6 are displayed on a screen 110-1 of the display 110 illustrated in FIG. 3. Specifically, the application button 111-1 of a copy application1, the application button 111-2 of a scan application1, the application button 111-3 of a copy application2, the application button 111-4 of a copy application3, the application button 111-5 of a scan application2, and the application button 111-6 of a scan application3, are displayed on the screen 110-1. A user can activate any of the six applications through the screen 110-1. The user selects one of the application buttons 111-1 to 111-6 of the application desired to be activated. The processor 300 executes the application corresponding to the selected application button and displays the screen executing the application on the touch panel.

FIG. 4 is a diagram illustrating a specific example of the usage quantity information database 331 according to the first embodiment.

As illustrated in FIG. 4, the usage quantity information database 331 stores information on the usage quantity of each user for each MFP function. FIG. 4 illustrates a copy function, a scan function, a print function, and a FAX transmission function as an MFP function.

The example illustrated in FIG. 4 indicates that user 1 has used ten sheets with the copy function, user 2 one sheet, and user 3 two sheets.

In addition, the example illustrated in FIG. 4 indicates that user 1 has used three sheets with the scan function, user 2 fifty sheets, and user 3 seven sheets. In addition, the example illustrated in FIG. 4 indicates that user 1 has used seven sheets with the print function, user 2 six sheets, and user 3 eighty sheets. In addition, the example illustrated in FIG. 4 indicates that user 1 has used four sheets with the FAX transmission function, user 2 zero sheet, and user 3 zero sheet.

FIG. 5 is a diagram illustrating an example of metadata setting of an application.

In the example of FIG. 5, application attributes, which describe the metadata setting of the application, are defined in an extensible markup language (XML) file. "AppId" indicates application identification information. "AppName" indicates a name of the application. "AppVersion" indicates a version of the application. "AppCreatedDate" indicates a creation date of the application. "AppSummary" indicates an overview of the application. "AppButtonName1" and "AppButtonName2" indicate application button names.

"SupportsTrialByUsedAmount" indicates an attribute as to whether or not to prohibit activation of the application depending on the usage quantity. If the activation of the application is prohibited according to the usage quantity, the attribute value is set to "True", and if the activation of the application is not prohibited according to the usage quantity, the attribute value is set to "False". "SupportsTrialPerUser" indicates an attribute as to whether Or not to prohibit the activation of the application depending on the usage quantity for each user. If the activation of the application is prohibited depending on the usage quantity for each user, the attribute value is set to "True", and if the activation of the application is not prohibited depending on the usage quantity for each user, the attribute value is set to "False".

"TrialAmount" indicates an upper limit of the usage quantity. In the first embodiment, "TrialAmount" indicates an upper limit of the usage quantity of one or more MFP functions. "TrialAmount" is set to an integer value. For example, FIG. 5 illustrates that an upper limit of the copy function is 100, an upper limit of the scan function is 50, an upper limit of the print function is 80, and an upper limit of the FAX transmission function is 10.

Figure 6:
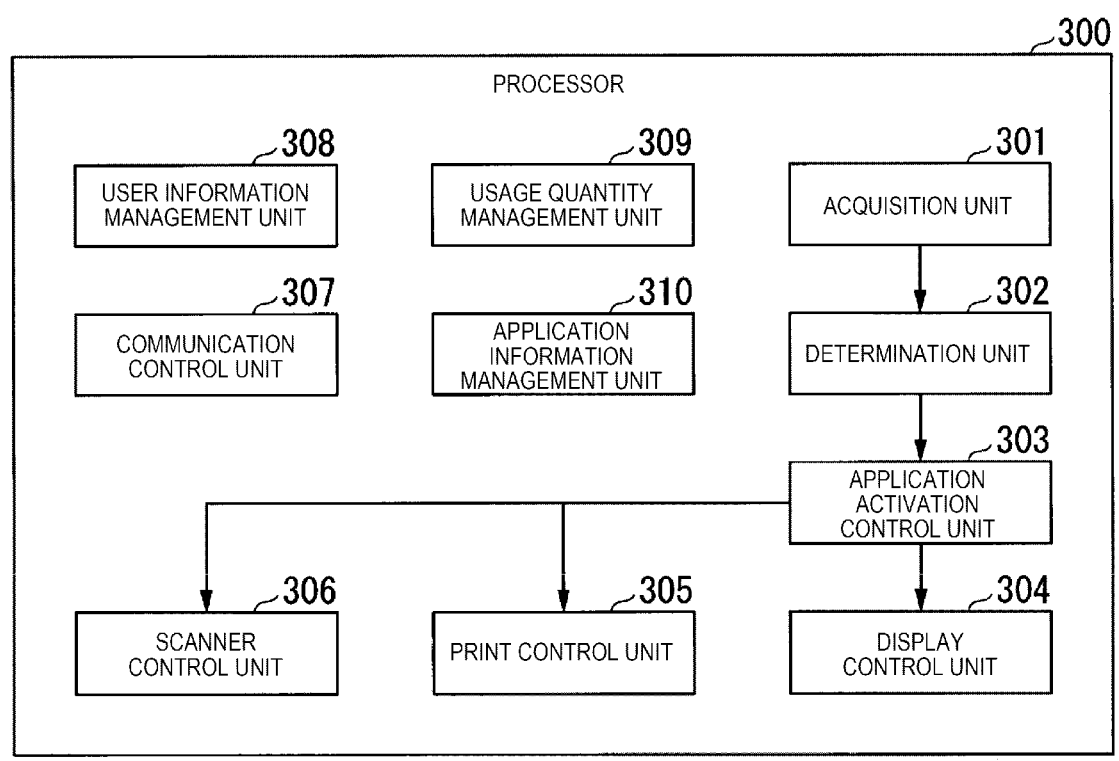
FIG. 6 is a schematic block diagram illustrating a functional configuration of a processor.

FIG. 6 is a schematic block diagram illustrating a functional configuration of the processor 300 according to the first embodiment. As illustrated, the processor 300 is programmed to function as an acquisition unit 301, a determination unit 302, an application activation control unit 303, a display control unit 304, a print control unit 305, a scanner control unit 306, a communication control unit 307, a user information management unit 308, a usage quantity management unit 309, and an application information management unit 310.

The acquisition unit 301 acquires information on execution of an application. For example, the acquisition unit 301 acquires user information and an activation instruction of an application.

The determination unit 302 determines whether or not a usage quantity exceeds an upper limit value based on the information acquired by the acquisition unit 301 and the database stored in the auxiliary storage device 330. For example, the determination unit 302 determines whether or not the usage quantity of a user acquired by the acquisition unit 301 exceeds the upper limit value.

The application activation control unit 303 controls activation of the application selected by the user based on the determination result of the determination unit 302. For example, if the determination unit 302 determines that the usage quantity exceeds the upper limit value, the application activation control unit 303 prohibits the activation of the application selected by the user. That is, if the determination unit 302 determines that the usage quantity exceeds the upper limit value, the application activation control unit 303 does not activate the application. In addition, for example, if the determination unit 302 determines that the usage quantity does not exceed the upper limit value, the application activation control unit 303 activates the application selected by the user. That is, if the determination unit 302 determines that the usage quantity does not exceed the upper limit value, the application activation control unit 303 activates the application so as to allow the MFP function to be used.

The display control unit 304 controls displaying on the display 110. In addition, the display control unit 304 detects a user operation performed on the display 110. The display control unit 304, for example, detects that a user presses the application button on the screen 110-1 illustrated in FIG. 3, and outputs an execution instruction of the application.

The print control unit 305 controls the printer unit 130 based on an application (for example, a print application) executed by the application activation control unit 303.

The scanner control unit 306 controls the image reading unit 200 based on an application (for example, a scan application or a copy application) executed by the application activation control unit 303.

The communication control unit 307 controls the network interface 320. The communication control unit 307 performs connection to a facsimile device and transmission of image information, based on an application (for example, a FAX transmission application) executed by the application activation control unit 303. The image information which is transmitted is, for example, an image read by the image reading unit 200.

The user information management unit 308 manages user information stored in the user information database 332.

The usage quantity management unit 309 adds the usage quantity stored in the usage quantity information database 331 to the usage quantity used by the application.

The application information management unit 310 installs the application using the application package stored in the application database 333.

Figure 7:
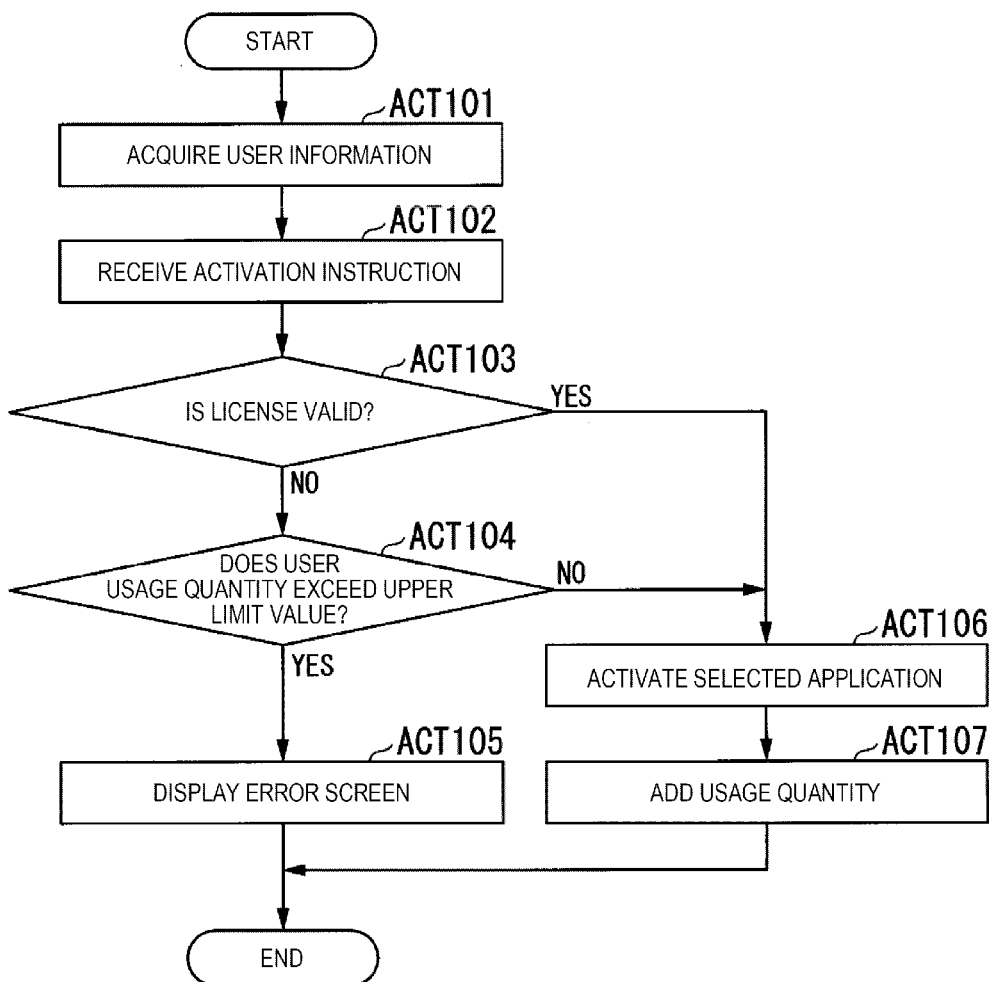
FIG. 7 is a flowchart illustrating a flow of processing of the image processing apparatus.

FIG. 7 is a flowchart illustrating a flow of processing of the image processing apparatus 100 according to the first embodiment.

The acquisition unit 301 acquires user information (ACT 101). The acquisition unit 301 may acquire the user information obtained from a card possessed by a user using a card reader. In addition, the acquisition unit 301 may acquire user information directly input to the display 110. The acquisition unit 301 outputs the acquired user information to the determination unit 302.

The display 110 receives an input of an activation instruction of the application (ACT 102). That is, the display 110 receives selection of the application. If the application is selected, the display 110 outputs the selected application identification information to the processor 300. The acquisition unit 301 acquires the application identification information output from the display 110, and outputs the acquired application identification information to the determination unit 302.

The determination unit 302 determines whether or not a license of the application identified by the application identification information is valid with reference to the application database 333 (ACT 103). For example, if the license of the application identified by the application identification information is stored in the application database 333, the determination unit 302 determines that the license is valid. For example, if the license of the application identified by the application identification information is not stored in the application database 333, the determination unit 302 determines that the license is not valid. If the license of the application is not valid (ACT 103: NO), the determination unit 302 determines whether or not a user usage quantity exceeds the upper limit value (ACT 104).

Specifically, first, the determination unit 302 acquires the usage quantity of the MFP function which has been used by the application selected by the user with reference to the usage quantity information database 331. Next, the determination unit 302 acquires the upper limit value of the usage quantity of the MFP function which is used by the application selected by the user with reference to the application database 333. Then, the determination unit 302 compares the acquired usage quantity with the upper limit value, to determine whether or not the usage quantity of the user exceeds the upper limit value.

If the usage quantity of the user exceeds the upper limit value (ACT 104: YES), the determination unit 302 outputs an NG notification to the application activation control unit 303. The NG notification indicates that the activation of the application is not allowed. If the NG notification is output, the application activation control unit 303 prohibits activation of the application. Then, the application activation control unit 303 instructs the display control unit 304 to display an error screen. The display control unit 304 causes an error screen to be displayed on a screen of the display 110 (ACT 105). For example, the display control unit 304 causes the error screen to be displayed on the screen of the display 110 as a pop-up screen.

Figure 8:
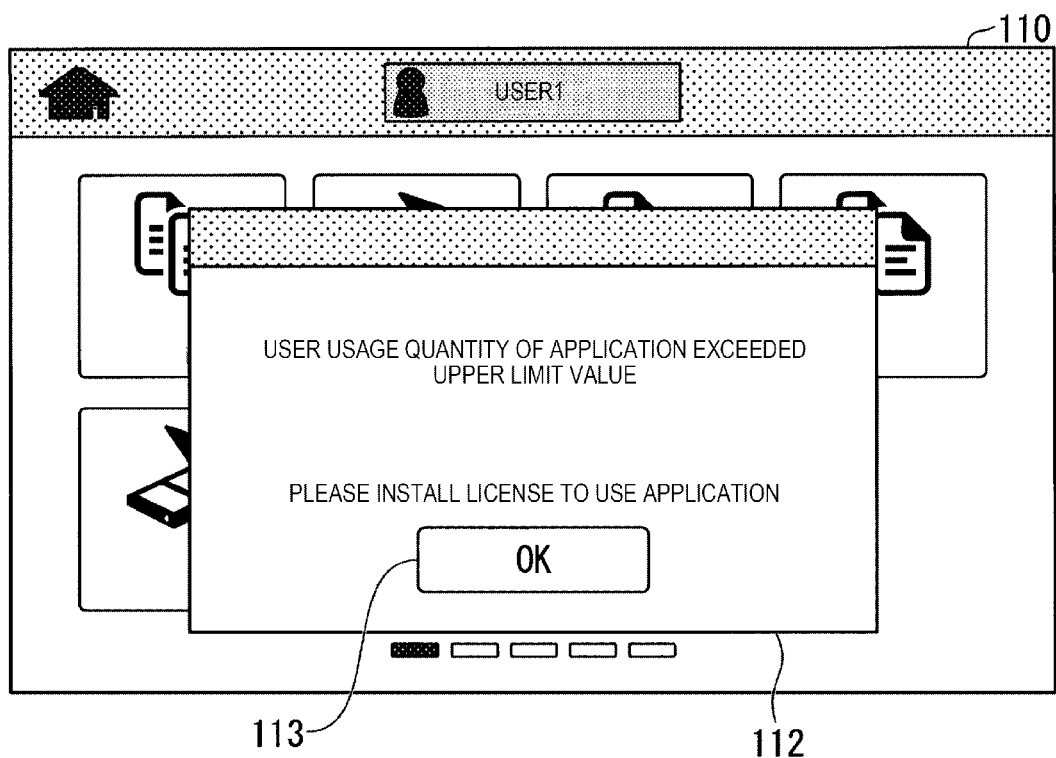
FIG. 8 is a diagram illustrating an example of an error screen displayed on the display.

FIG. 8 is a diagram illustrating an example of the error screen displayed on the display 110.

As illustrated in FIG. 8, an error screen 112 is displayed on the screen of the display 110 in an overlapping manner. A notification indicating that the usage quantity of the user exceeds, a notification prompting installation of the license, and an OK button 113, are displayed on the error screen 112. The OK button 113 is selected when confirmation is made by the user. If the OK button 113 is selected, the display control unit 304 removes the error screen 112 from the screen of the display 110.

Referring back to FIG. 7, the explanation of the processing is continued below.

If the application license is valid (ACT 103: YES), the determination unit 302 outputs the OK notification to the application activation control unit 303. In addition, if the usage quantity of the user does not exceed the upper limit value (ACT 104: NO), the determination unit 302 outputs the OK notification to the application activation control unit 303. The OK notification indicates that the activation of the application is allowed. If the OK notification is output, the application activation control unit 303 activates the selected application (ACT 106).

For example, if the selected application is a scan application, the application activation control unit 303 executes the scan application. The scanner control unit 306 controls the image reading unit 200 based on the application executed by the application activation control unit 303. Thereafter, the usage quantity management unit 309 adds the usage quantity of the MFP function to the executed application (ACT 107). Specifically, the usage quantity management unit 309 adds the number of sheets of paper used in the MFP function to the usage quantity of the user. For example, if user 1 uses ten sheets in the copy function, the usage quantity management unit 309 adds ten to the usage quantity of copy of user 1.

In addition, for example, if the selected application is a print application, the application activation control unit 303 executes the print application. The print control unit 305 controls the printer unit 130 based on the application executed by the application activation control unit 303. Thereafter, the usage quantity management unit 309 adds the usage quantity of the MFP function to the executed application (ACT 107).

According to the image processing apparatus 100 configured as described above, it is possible to effectively use an application whose license is not valid. Specifically, the image processing apparatus 100 allows use of the MFP function by an application for which the license is not valid, based on the usage quantity of the MFP function, until the usage quantity reaches the upper limit value. In this way, the image processing apparatus 100 prohibits the use of the application according to the usage quantity (for example, the number of used sheets) of the MFP function by the application, not by a predefined time period. As a result, for so long as an application whose license is not valid is not used, the application still can be used on a trial basis. Therefore, it is possible to effectively use the application whose license is not valid.

In addition, the image processing apparatus 100 prohibits the activation of the application by the usage quantity of the MFP function for each user. As a result, even if one user uses the application many times, this does not affect application usage by other users. Thus, many different users can use the MFP function through an application on a trial basis.

Hereinafter, a modification of the image processing apparatus 100 according to the first embodiment will be described.

The image processing apparatus 100 may be configured to control activation of an application based on a user usage quantity and a trial period. The trial period is a period in which the MFP function can be used by the application even if a license is not valid. The trial period is, for example, a predetermined period (for example, 30 days) from the date when the image processing apparatus 100 installs the application, or the date and time when the application is activated. Information on the trial period, the date on which the application is installed, or the date and time when the application is activated is stored in the application database 333. In the following description, it is assumed that the trial period is a predetermined period from the date and time when the application is activated. Hereinafter, a description will be given on processing when the image processing apparatus 100 controls the activation of the application based on the user usage quantity and the trial period, with reference to FIG. 9.

Figure 9:
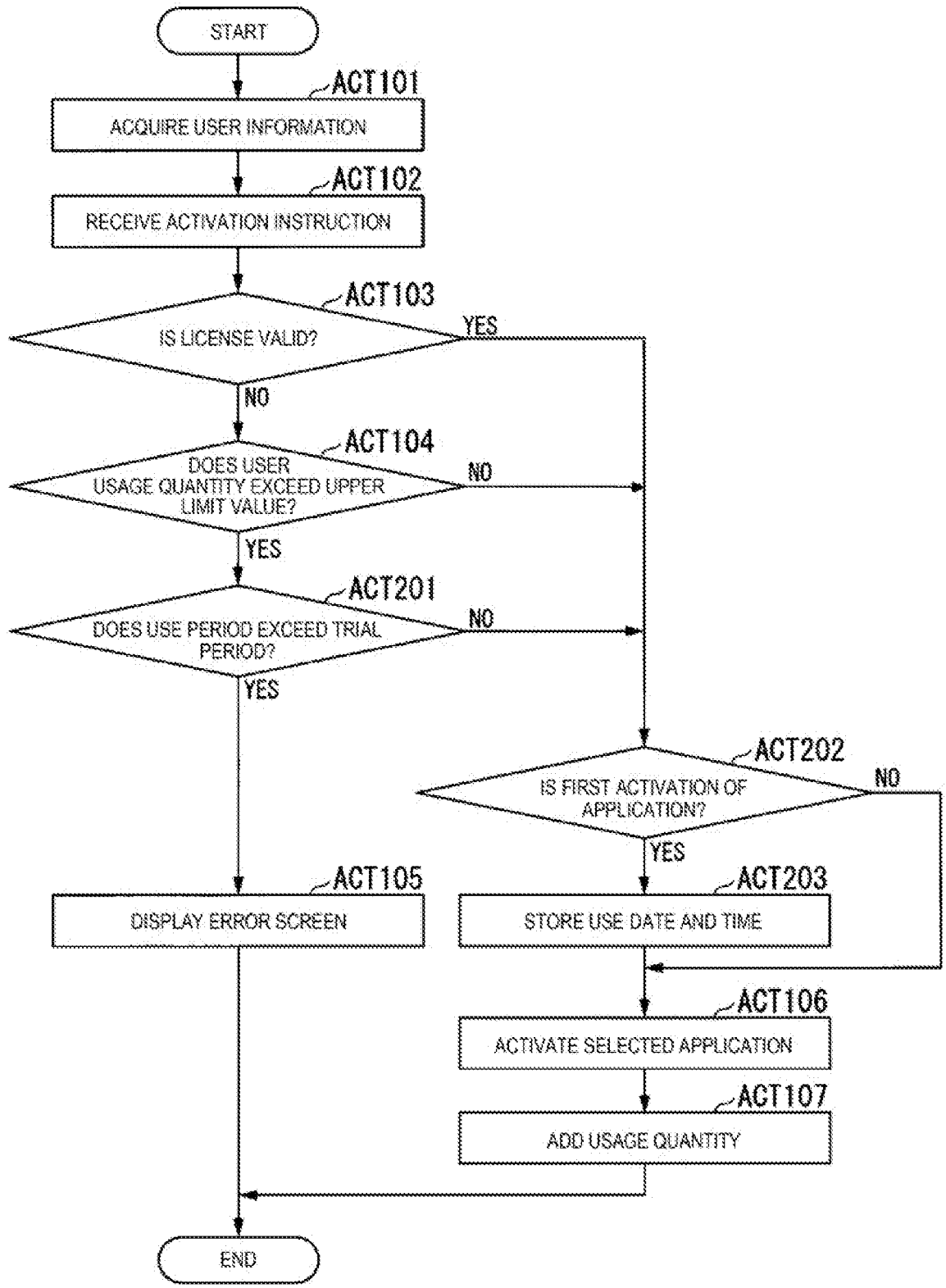
FIG. 9 is a flowchart illustrating a flow of processing when the image processing apparatus controls activation of the application based on a user usage quantity and a trial period.

FIG. 9 is a flowchart illustrating a flow of processing when the image processing apparatus 100 controls activation of an application based on a user usage quantity and a trial period. In FIG. 9, processing which is the same as in FIG. 7 is denoted by the same reference numeral as in FIG. 7, and description thereof will not be repeated.

Next, if a usage quantity of a user exceeds an upper limit value (ACT 104: YES), the determination unit 302 determines whether or not the use period exceeds the trial period of the selected application (ACT 201). Specifically, first, the determination unit 302 acquires information on the trial period of the application identified by the application identification information and the date on which the application is activated, with reference to the application database 333. At this time, after the application identified by the application identification information is installed, if the application is never activated, information on the date and time when the application is activated is not acquired.

Next, the determination unit 302 compares a use period from the date and time when the application is activated to the current date and time with the trial period. Then, if the use period exceeds the trial period, the determination unit 302 determines that the use period exceeds the trial period of the application. In addition, if the use period does not exceed the trial period, the determination unit 302 determines that the use period does not exceed the trial period of the application. If information on the date and time when the application is activated is not acquired, this means that the application has not been activated, so the determination unit 302 determines that the use period does not exceed the trial period of the application. If the use period exceeds the trial period of the application (ACT 201: YES), the image processing apparatus 100 performs processing of ACT 105.

If the usage quantity of the user does not exceed an upper limit value (ACT 104: NO), or the use period does not exceed the trial period of the application (ACT 201: NO), the determination unit 302 determines whether or not the application identified by the application identification information is being activated for the first time (ACT 202). Specifically, if information on the date and time when the application is activated is acquired, the determination unit 302 determines that the application is not being activated for the first time. Meanwhile, if the information on the date and time when the application is activated is not acquired, the determination unit 302 determines that the application is being activated for the first time. If the application is not being activated for the first time (ACT 202: NO), the image processing apparatus 100 performs processing of ACT 106.

Meanwhile, if the application is being activated for the first time (ACT 202: YES), the application information management unit 310 stores the use date and time of the application in the application database 333 (ACT 203). For example, the application information management unit 310 associates the date and time when the application is activated with the application identification information and stores them as the use date and time of the application. Thereafter, the image processing apparatus 100 performs processing of ACT 106.

By configuring as described above, the image processing apparatus 100 activates the application even if the user usage quantity exceeds an upper limit value, if the use period does not exceed the trial period. Thereby, even for users who use many MFP functions in a short period, applications can be effectively used during the trial period. Accordingly, it is possible to improve convenience.

FIG. 9 illustrates a configuration in which the application is activated even if the user usage quantity exceeds the upper limit value, if the use period does not exceed the trial period. Alternatively, the application activation control unit 303 may be configured to activate the application even if the use period exceeds the trial period, if the user usage quantity does not exceed the upper limit value. In addition, for example, the application activation control unit 303 may be configured to prohibit the use of the application if the user usage quantity exceeds the upper limit value or if the use period exceeds the trial period.

Second Embodiment

In a second embodiment, a configuration will be described in which the image processing apparatus 100 controls activation of an application based on usage quantity of each application for each user.

The image processing apparatus 100 according to the second embodiment includes the same hardware components as the image processing apparatus 100 according to the first embodiment, but processing performed by the image processing apparatus 100 is different. Therefore, differences from the first embodiment will be described.

In the second embodiment, an attribute as to whether or not activation of an application is prohibited by the usage quantity of the application for each user is set in the metadata of the application as an application attribute. If the activation of an application is prohibited by the usage quantity of the application, the attribute value is set to "True", and if the activation of the application is not prohibited by the usage quantity of the application, the attribute value is set to "False". In addition, in the second embodiment, an upper limit of the usage quantity of an application is set in the attribute "TrialAmount".

In addition, in the second embodiment, a usage quantity information database 331a is stored in the auxiliary storage device 330 instead of the usage quantity information database 331.

The usage quantity information database 331a stores information of the usage quantity of an application that employs the MFP function for each user. For example, the usage quantity information database 331a stores the information on the usage quantity of each application for each user.

The application activation control unit 303 according to the second embodiment controls activation of the application based on the usage quantity of each application for each user.

Figures 10, 11:
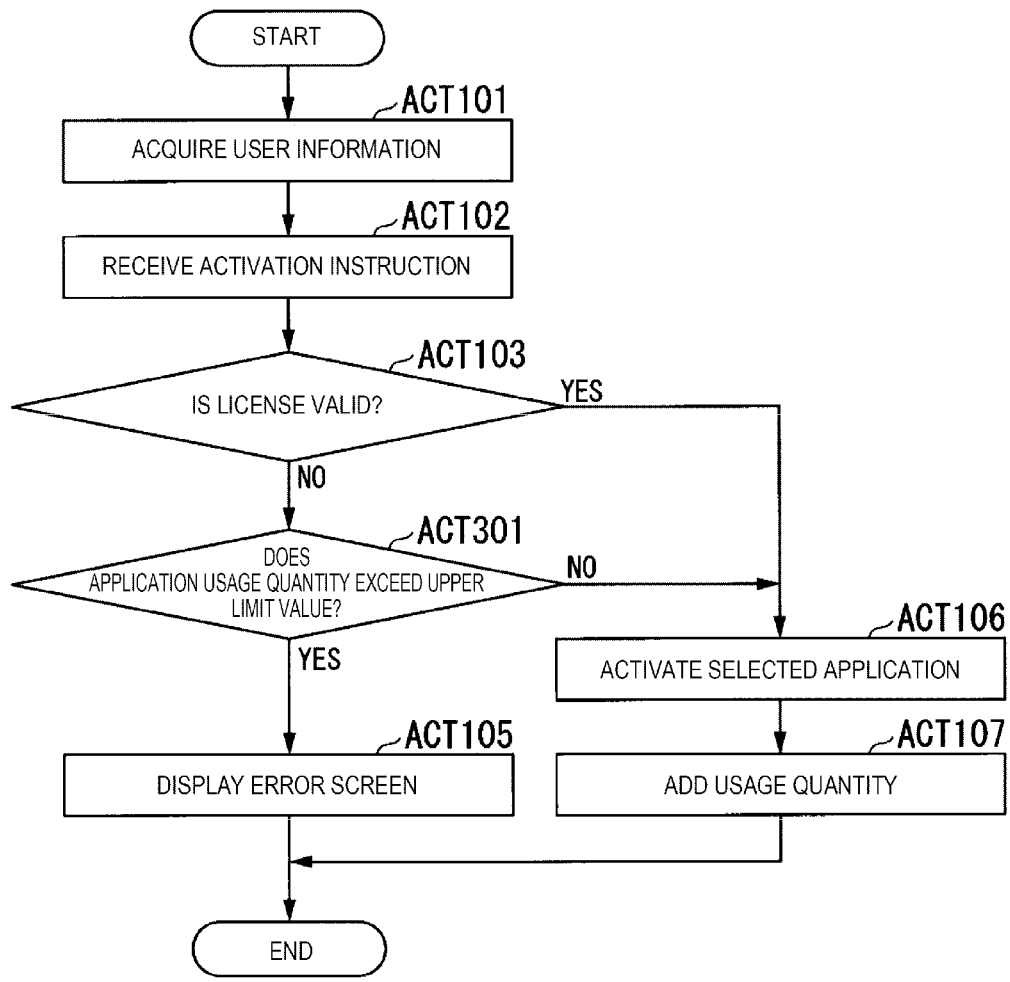
FIG. 10 is a diagram illustrating a specific example of a usage quantity information database according to a second embodiment.
FIG. 11 is a flowchart illustrating a flow of processing of the image processing apparatus according to the second embodiment.

FIG. 10 is a diagram illustrating a specific example of the usage quantity information database 331a according to the second embodiment.

In FIG. 10, application A, application B, and application C are illustrated as the applications. Each application can employ one MFP function or a plurality of MFP functions. In the second embodiment, activation of the application is prohibited by the usage quantity of one application, not the usage quantity of the MFP function.

The example illustrated in FIG. 10 indicates that user 1 has used ten sheets with application A, user 2 one sheet, and user 3 uses two sheets.

In addition, the example illustrated in FIG. 10 indicates that user 1 has used three sheets with application B, user 2 fifty sheets, and user 3 seven sheets.

In addition, the example illustrated in FIG. 10 indicates that user 1 has used seven sheets with application C, user 2 six sheets, and user 3 eighty sheets.

FIG. 11 is a flowchart illustrating a flow of processing of the image processing apparatus 100 according to the second embodiment. In FIG. 11, processing which is the same as in FIG. 7 is denoted by the same reference numeral as in FIG. 7, and description thereof will not be repeated.

If an application license is not valid (ACT 103: NO), the determination unit 302 determines whether or not an application usage quantity exceeds an upper limit value (ACT 301). Specifically, first, the determination unit 302 acquires information on the usage quantity of the application selected by a user with reference to the usage quantity information database 331. Next, the determination unit 302 acquires the upper limit value of the usage quantity of the application selected by the user with reference to the application database 333. Then, the determination unit 302 compares the acquired usage quantity with the upper limit value, thereby, determining whether or not the application usage quantity of the user exceeds the upper limit value.

If the application usage quantity of the user exceeds the upper limit value (ACT 301: YES), the determination unit 302 outputs an NG notification to the application activation control unit 303. Thereafter, the image processing apparatus 100 performs processing of the ACT 105.

Meanwhile, if the application usage quantity of the user does not exceed the upper limit value (ACT 301: NO), the determination unit 302 outputs an OK notification to the application activation control unit 303. Thereafter, the image processing apparatus 100 performs processing of the ACT 106 and subsequent processing.

According to the image processing apparatus 100 of the second embodiment configured as described above, activation of an application is prohibited by the usage quantity of each application, for each user. Thereby, even if one user uses the application many times, this does not affect application usage by other users. Thus, many different users can employ the MFP function using the application on a trial basis.

Hereinafter, a modification example of the image processing apparatus 100 according to the second embodiment will be described.

The image processing apparatus 100 may be configured to control activation of an application based on an application usage quantity and a trial period. Specific processing thereof is the same as the processing of FIG. 9 except that the processing of ACT 104 in FIG. 9 is replaced with the processing of ACT 301 in FIG. 11, and thus, description thereof will not be repeated.

In addition, the application activation control unit 303 may be configured to activate the application even if the application usage quantity exceeds the upper limit value, if the use period does not exceed the trial period. In addition, for example, the application activation control unit 303 may be configured to activate the application even if the use period exceeds the trial period, if the application usage quantity does not exceed the upper limit value. In addition, for example, the application activation control unit 303 may be configured to prohibit the use of the application if the application usage quantity exceeds the upper limit value or if the use period exceeds the trial period.

Third Embodiment

In a third embodiment, a configuration will be described in which the image processing apparatus 100 controls activation of an application, based on the total usage quantity of each MFP function by all users.

The image processing apparatus 100 according to the third embodiment includes the same hardware components as the image processing apparatus 100 according to the first embodiment, but processing performed by the image processing apparatus 100 is different. Therefore, differences from the first embodiment will be described.

In the third embodiment, an attribute as to whether or not to prohibit activation of an application is set based on the total usage quantity of each MFP function by all users, as an application attribute of metadata of the application. If the activation of the application is prohibited based on the total usage quantity of each user for each MFP function, the attribute value is set to "True", and if the activation of the application is not prohibited based on the total usage quantity, the attribute value is set to "False". In the third embodiment, an upper limit of the usage quantity of each MFP function is set in the attribute "TrialAmount".

In addition, in the third embodiment, a usage quantity information database 331b is stored in the auxiliary storage device 330, instead of the usage quantity information database 331.

The usage quantity information database 331b stores information on the usage quantity of the application that employs the MFP function, for each user. For example, the usage quantity information database 331b stores information on the total usage quantity of each MFP function for each user. The application activation control unit 303 according to the third embodiment prohibits the activation of the application based on the total usage quantity of each user for each MFP function.

Figures 12, 13:
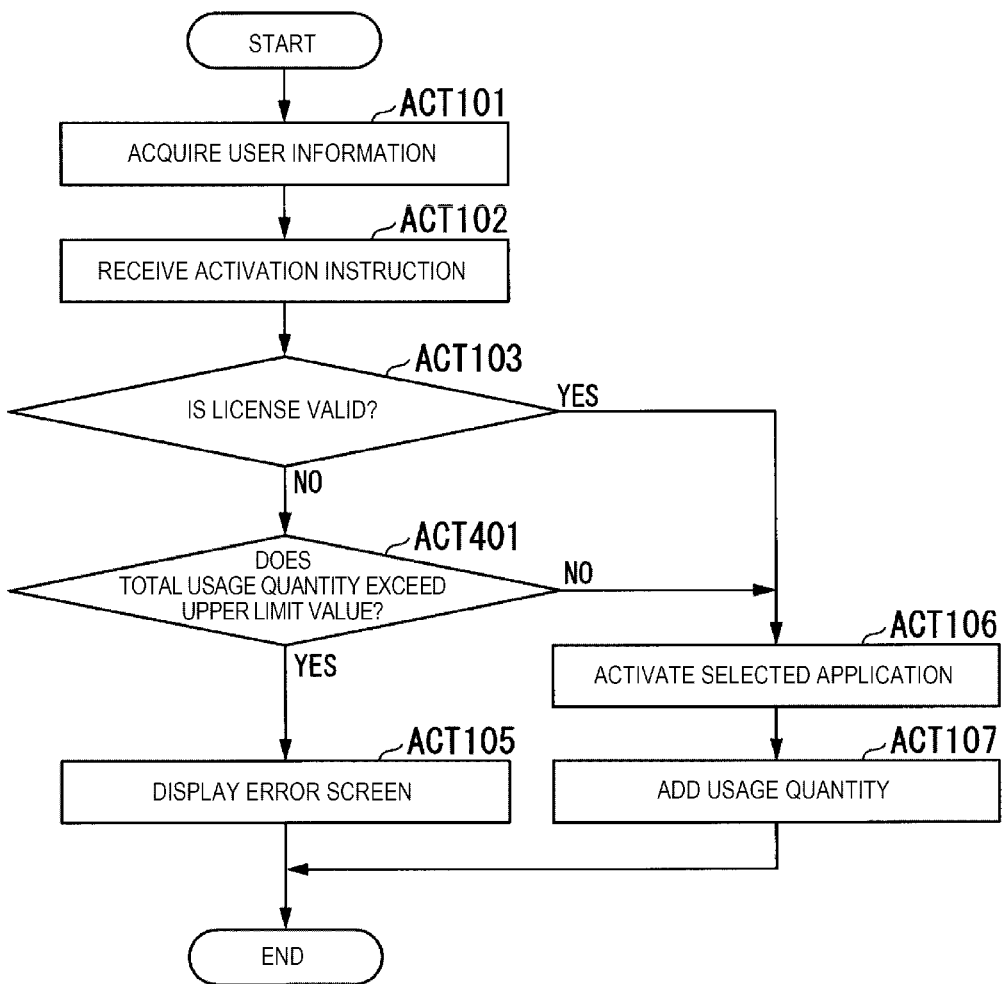
FIG. 12 is a diagram illustrating a specific example of a usage quantity information database according to a third embodiment.
FIG. 13 is a flowchart illustrating a flow of processing of an image processing apparatus according to the third embodiment.

FIG. 12 is a diagram illustrating a specific example of the usage quantity information database 331b according to the third embodiment.

FIG. 12 illustrates a copy function, a scan function, a print function, and a FAX transmission function as the MFP functions. The example illustrated in FIG. 12 indicates that user 1 has used ten sheets with the copy function, user 2 one sheet, user 3 two sheets, and all the users thirteen sheets.

FIG. 13 is a flowchart illustrating a flow of processing of the image processing apparatus 100 according to the third embodiment. In FIG. 13, processing which is the same as in FIG. 7 is denoted by the same reference numeral as in FIG. 7, and description thereof will not be repeated.

If a license of an application is not valid (ACT 103: NO), the determination unit 302 determines whether or not the total usage quantity exceeds an upper limit value (ACT 401). Specifically, first, the determination unit 302 acquires the total usage quantity of the MFP function of the application selected by a user with reference to the usage quantity information database 331b. Next, the determination unit 302 acquires the upper limit value of the usage quantity of the application selected by the user with reference to the application database 333. Then, the determination unit 302 compares the total usage quantity with the upper limit value, thereby, determining whether or not the total usage quantity of the selected MFP function exceeds the upper limit value.

If the total usage quantity of the MFP function exceeds the upper limit value (ACT 401: YES), the determination unit 302 outputs an NG notification to the application activation control unit 303. Thereafter, the image processing apparatus 100 performs processing of the ACT 105.

Meanwhile, if the total usage quantity of the MFP function does not exceed the upper limit value (ACT 401: NO), the determination unit 302 outputs an OK notification to the application activation control unit 303. Thereafter, the image processing apparatus 100 performs the processing after the ACT 106.

According to the image processing apparatus 100 of the third embodiment configured as described above, activation of the application is prohibited by total usage quantity of the MFP function. The image processing apparatus 100 allows the MFP function to be used by the application whose license is not valid until the total usage quantity reaches the upper limit value. In this way, the image processing apparatus 100 prohibits the application to be activated according to the total usage quantity (for example, the number of used sheets) of the MFP function by the application, not by a predefined time period. As a result, for so long as an application whose license is not valid is not used, the application still can be used on a trial basis. Accordingly, it is possible to effectively use the application whose license is not valid.

Hereinafter, a modification example of the image processing apparatus 100 according to the third embodiment will be described.

The image processing apparatus 100 may be configured to control activation of an application based on the total usage quantity and the trial period. Specific processing thereof is the same as in FIG. 9 except that the processing of the ACT 104 of FIG. 9 is replaced with processing of the ACT 401 of FIG. 13, and thus, description thereof will not be repeated.

In addition, the application activation control unit 303 may be configured to activate the application even if the total usage quantity exceeds the upper limit value, if the use period does not exceed the trial period. In addition, for example, the application activation control unit 303 may be configured to activate the application even if the use period exceeds the trial period, if the total usage quantity does not exceed the upper limit value. In addition, for example, the application activation control unit 303 may be configured to prohibit the use of the application if the total usage quantity exceeds the upper limit value or if the use period exceeds the trial period.

Fourth Embodiment

In a fourth embodiment, a configuration will be described in which the image processing apparatus 100 controls activation of an application based on a method set among the methods described in the first embodiment to the third embodiment.

The image processing apparatus 100 according to the fourth embodiment includes the same hardware components as the image processing apparatus 100 according to the first embodiment, but the processing performed by the image processing apparatus 100 is different. Therefore, differences from the first embodiment will be described.

In the fourth embodiment, attributes of the first to third embodiments are application attributes that are set in the metadata of the application.

In addition, in the fourth embodiment, a usage quantity information database 331c is stored in the auxiliary storage device 330, instead of the usage quantity information database 331.

The usage quantity information database 331c stores information on usage quantity of the application the employ the MFP function, for each user. For example, the usage quantity information database 331c stores information on usage quantity of each user and the total usage quantity of each MFP function and of each application. The application activation control unit 303 according to the fourth embodiment prohibits activation of the application based on the set method.

FIG. 14 is a diagram illustrating a specific example of the usage quantity information database 331c according to the fourth embodiment.

FIG. 14 illustrates a copy function, a scan function, a print function, and a FAX transmission function as MFP functions. In addition, application A and application B are illustrated as applications. The example illustrated in FIG. 14 indicates that user 1 has used ten sheets with the copy function, user 2 one sheet, user 3 two sheets, and all the users thirteen sheets. In addition, the example illustrated in FIG. 14 indicates that user 1 has used five sheets with application A, user 2 six sheets, user 3 seven sheets, and all the users eighteen sheets.

Figure 15:
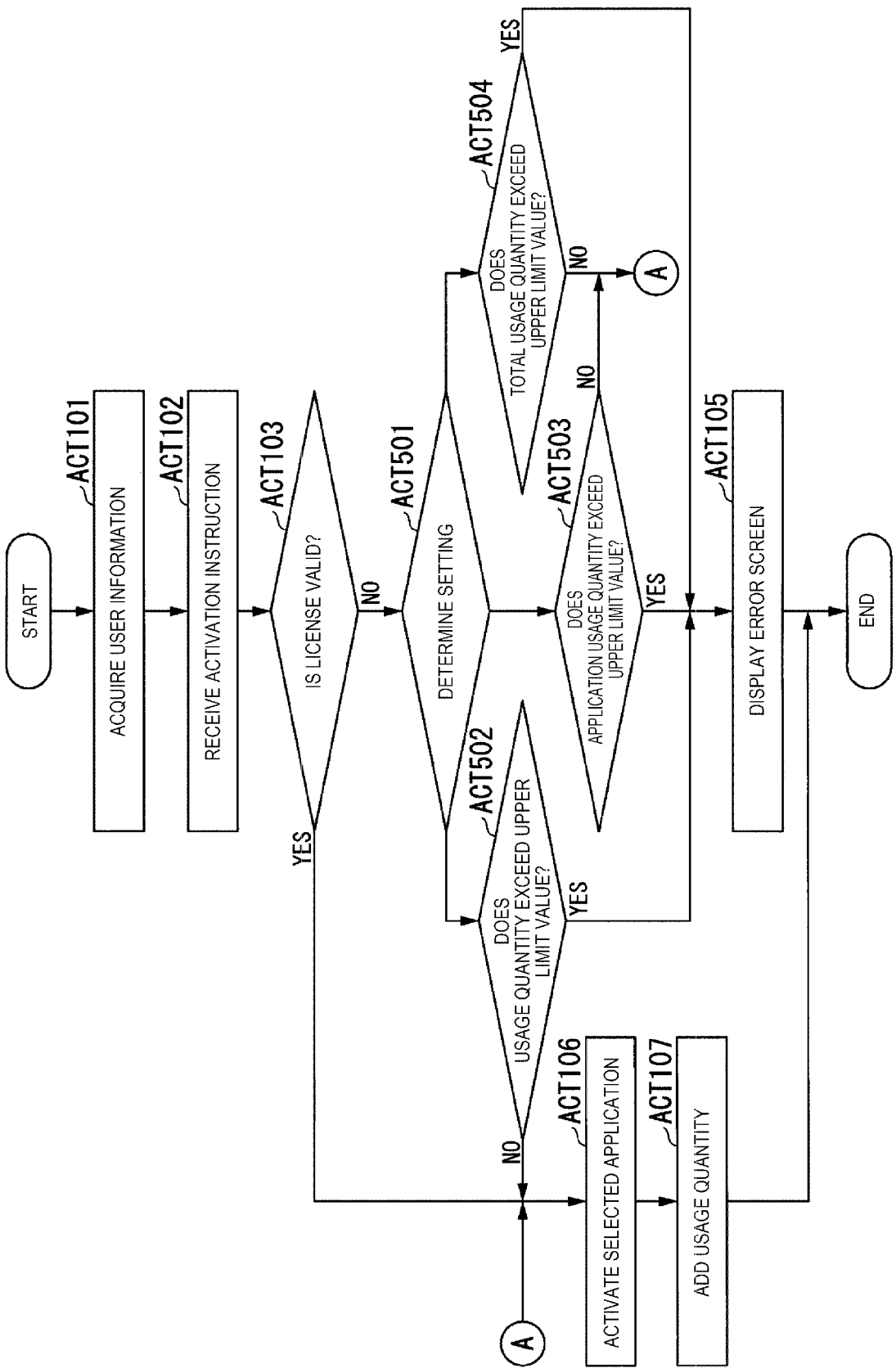
FIG. 15 is a flowchart illustrating a flow of processing of an image processing apparatus according to the fourth embodiment.

FIG. 15 is a flowchart illustrating a flow of processing of the image processing apparatus 100 according to the fourth embodiment. In FIG. 15, processing which is the same as in FIG. 7 is denoted by the same reference numeral as in FIG. 7, and description thereof will not be repeated.

If a license of an application is not valid (ACT 103: NO), the determination unit 302 determines setting of the determination unit 302 (ACT 501). Specifically, the determination unit 302 determines the setting as one of setting based on the user usage quantity, setting based on the application usage quantity, or setting based on the total usage quantity. If the setting is the setting based on the user usage quantity (ACT 501: setting for each user), the determination unit 302 determines whether or not the user usage quantity exceeds the upper limit value (ACT 502). Specific processing thereof is the same as in the first embodiment, and thus, description thereof will not be repeated.

If the user usage quantity exceeds the upper limit value (ACT 502: YES), the determination unit 302 outputs an NG notification to the application activation control unit 303. Thereafter, the image processing apparatus 100 performs the processing of the ACT 105.

Meanwhile, if the user usage quantity does not exceed the upper limit value (ACT 502: NO), the determination unit 302 outputs an OK notification to the application activation control unit 303. Thereafter, the image processing apparatus 100 performs the processing of the ACT 106 and subsequent processing.

If the setting is the setting based on the application usage quantity (ACT 501: setting for each application), the determination unit 302 determines whether or not the application usage quantity exceeds the upper limit value (ACT 503). Specific processing thereof is the same as in the second embodiment, and thus, description thereof will not be repeated.

If the application usage quantity exceeds the upper limit value (ACT 503: YES), the determination unit 302 outputs an NG notification to the application activation control unit 303. Thereafter, the image processing apparatus 100 performs the processing of ACT 105.

Meanwhile, if the application usage quantity does not exceed the upper limit value (ACT 503: NO), the determination unit 302 outputs an OK notification to the application activation control unit 303. Thereafter, the image processing apparatus 100 performs the processing of the ACT 106 and subsequent processing.

If the setting is the setting based on the total usage quantity (ACT 501: total setting), the determination unit 302 determines whether or not the total usage quantity exceeds the upper limit value (ACT 504). Specific processing thereof is the same as in the third embodiment, and thus, description thereof will not be repeated.

If the total usage quantity exceeds the upper limit value (ACT 504: YES), the determination unit 302 outputs an NG notification to the application activation control unit 303. Thereafter, the image processing apparatus 100 performs the processing of the ACT 105.

Meanwhile, if the total usage quantity does not exceed the upper limit value (ACT 504: NO), the determination unit 302 outputs an OK notification to the application activation control unit 303. Thereafter, the image processing apparatus 100 performs the processing of the ACT 106 and subsequent processing.

According to the image processing apparatus 100 of the fourth embodiment configured as described above, it is possible to effectively use an application whose license is not valid. The image processing apparatus 100 allows the MFP function to be used by the application until any one of the application usage quantity, the user usage quantity, and the total usage quantity reaches the upper limit value. In this way, the image processing apparatus 100 prohibits activation of the application according to the usage quantity (for example, the number of used sheets) of the MFP function employed by the application, not by a predefined time period. As a result, for so long as an application whose license is not valid has not been used, the application whose license is not valid still can be used. Accordingly, it is possible to effectively use the application whose license is not valid.

Hereinafter, a modification example of the image processing apparatus 100 according to the fourth embodiment will be described.

The image processing apparatus 100 may be configured to control activation of the application based on any one of the user usage quantity, the application usage quantity, and the total usage quantity, and the trial period. Specific processing thereof is the same as in FIG. 9 except that the processing of ACT 104 in FIG. 9 is replaced with any one of several types of processing of ACT 502, ACT 503, and ACT 504 in FIG. 15, and thus, description thereof will not be repeated.

In addition, the application activation control unit 303 may be configured to activate the application even if the set usage quantity exceeds the upper limit value, if the use period exceeds the trial period. Here, the set usage quantity is any one of the user usage quantities, the application usage quantity, and the total usage quantity which are set by the image processing apparatus 100. In addition, for example, the application activation control unit 303 may be configured to activate the application even if the use period exceeds the trial period, if the set usage quantity does not exceed the upper limit value. In addition, for example, the application activation control unit 303 may be configured to prohibit use of the application even if the set usage quantity exceeds the upper limit value or if the use period exceeds the trial period.

Fifth Embodiment

In a fifth embodiment, a management device, e.g., a management server, that manages the image processing apparatus determines whether or not the usage quantity exceeds the upper limit value, and the image processing apparatus prohibits activation of the application based on the determination result.

Figure 16:
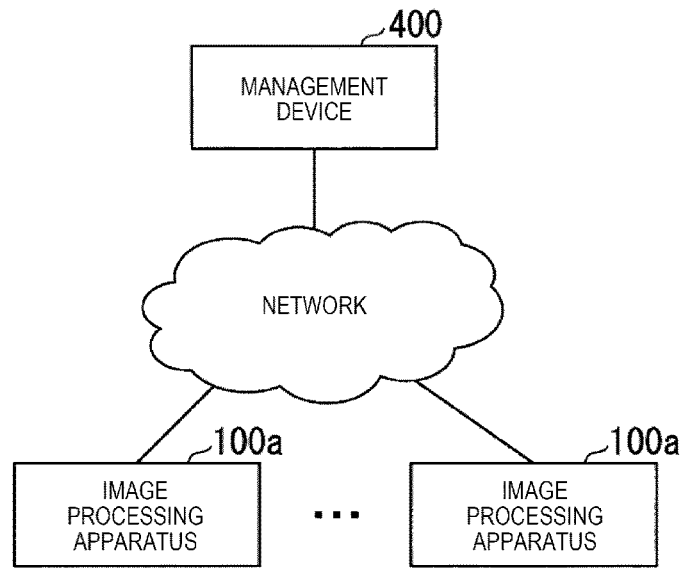
FIG. 16 is a schematic block diagram illustrating a configuration of an image processing system according to a fifth embodiment.

FIG. 16 is a schematic block diagram illustrating a configuration of an image processing system.

The image processing system includes one or a plurality of image processing apparatuses 100a and a management device 400.

After an application is installed, the image processing apparatus 100a displays an execution instruction image of the installed application on a screen of a display. The image processing apparatus 100a controls activation of the application according to the determination result indicating whether or not the usage quantity of the MFP function of the application exceeds the upper limit value.

The management device 400 manages the activation of an application in the image processing apparatus 100a. The management device 400 acquires an application execution instruction from the image processing apparatus 100a and determines whether or not the usage quantity of the MFP function exceeds the upper limit value based on the acquired execution instruction. The management device 400 manages the activation of the application by transmitting the determination result to the image processing apparatus 100a.

Figure 17:
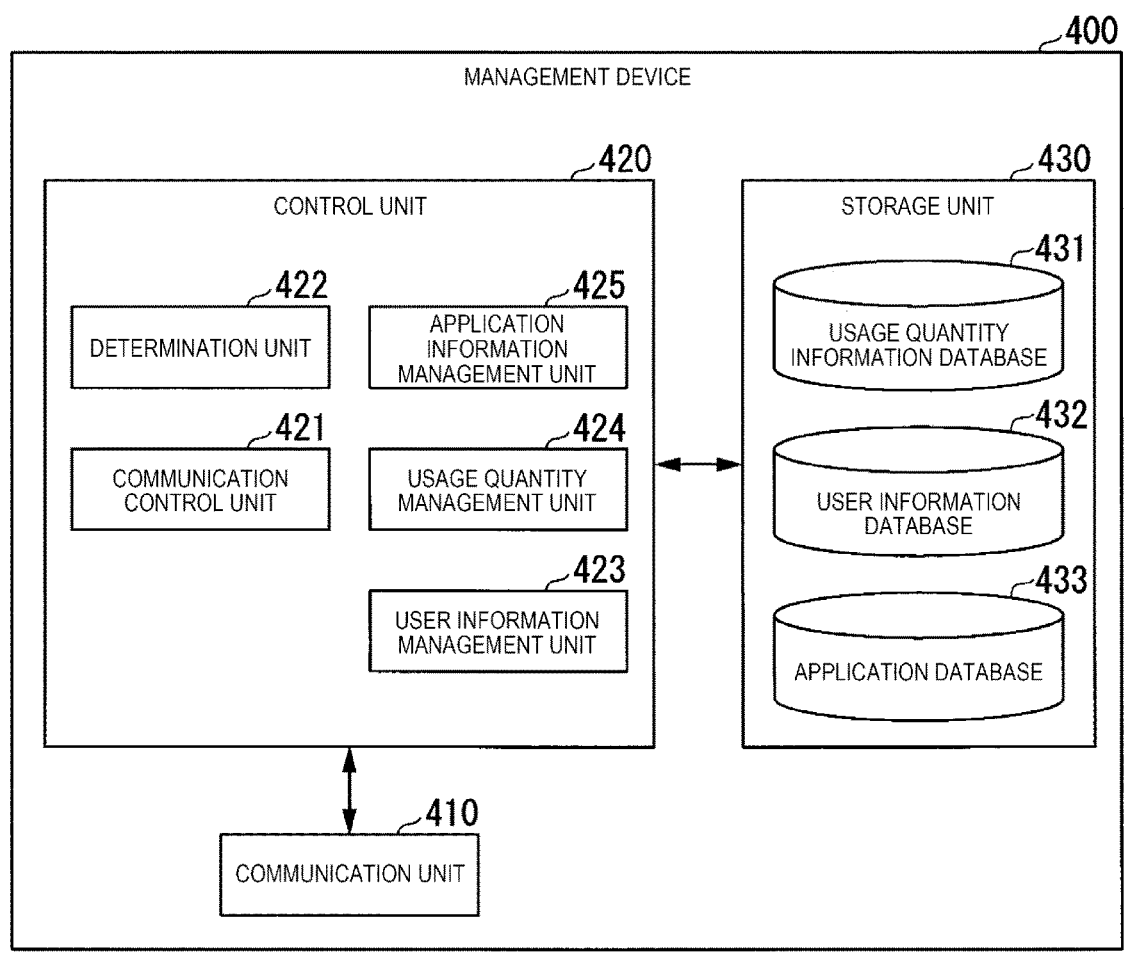
FIG. 17 is a schematic block diagram illustrating a functional configuration of a management device according to the fifth embodiment.

FIG. 17 is a schematic block diagram illustrating a functional configuration of the management device 400.

The management device 400 includes a CPU, a memory, an auxiliary storage device, and the like which are connected by a bus, and executes a management program. By executing the management program, the management device 400 functions as a device including a communication unit 410, a control unit 420, and a storage unit 430. All or a part of each function of the management device 400 may be realized by using hardware such as an application specific integrated circuit (ASIC), a programmable logic device (PLD), a field programmable gate array (FPGA), or the like. In addition, the management program may be recorded on a computer readable recording medium. The computer-readable recording medium is, for example, a portable medium such as a flexible disk, a magneto-optical disk, a ROM, and a CD-ROM, or a storage device such as a hard disk built in a computer system. In addition, the management program may be transmitted and received via an electric communication line.

The communication unit 410 is realized by an interface controller and performs data communication with the image processing apparatus 100a.

The control unit 420 is realized by a processor, a memory, and an HDD. The processor is, for example, a CPU. The memory stores data which is directly referred to when the processor performs processing. The memory is, for example, a RAM. The HDD stores the management program. The HDD is, for example, a ROM. The processor operates as the control unit 420 by reading and executing the program from the HDD. The control unit 420 includes a communication control unit 421, a determination unit 422, a user information management unit 423, a usage quantity management unit 424, and an application information management unit 425.

The communication control unit 421 controls the communication unit 410. The communication control unit 421 controls the communication unit 410 to transmit a response to a request transmitted from the image processing apparatus 100a to the image processing apparatus 100a.

The determination unit 422 determines whether or not a usage quantity exceeds an upper limit value, based on information received by the communication unit 410 and a database stored in the storage unit 430. For example, the determination unit 422 determines whether or not the usage quantity of a user exceeds the upper limit value, based on the information received by the communication unit 410.

The user information management unit 423 manages user information stored in the user information database 432.

The usage quantity management unit 424 adds the usage quantity stored in the usage quantity information database 431 to the usage quantity used by an application.

The application information management unit 425 installs the application by using an application package stored in the application database 433.

The storage unit 430 is realized by a storage device such as a magnetic hard disk device or a semiconductor storage device. The storage unit 430 includes a usage quantity information database 431, a user information database 432, and an application database 433.

The usage quantity information database 431 stores information on the usage quantity of the MFP function performed by the application for each user. Information on the usage quantity of the MFP function performed by the application for each user is stored in the usage quantity information database 431, for each image processing apparatus 100a.

The user information database 432 stores user information. The user information indicates a user attribute of each of an administrator and a user. The user attribute stores user permissions. For example, user permissions include a copy execution authority, a scan execution authority, a print execution authority, and a Fax transmission execution authority. The user information database 432 stores user information for each image processing apparatus 100a.

The application database 433 stores an application package and license information. The application database 433 stores the application package and the license information for each image processing apparatus 100a.

Figure 18:
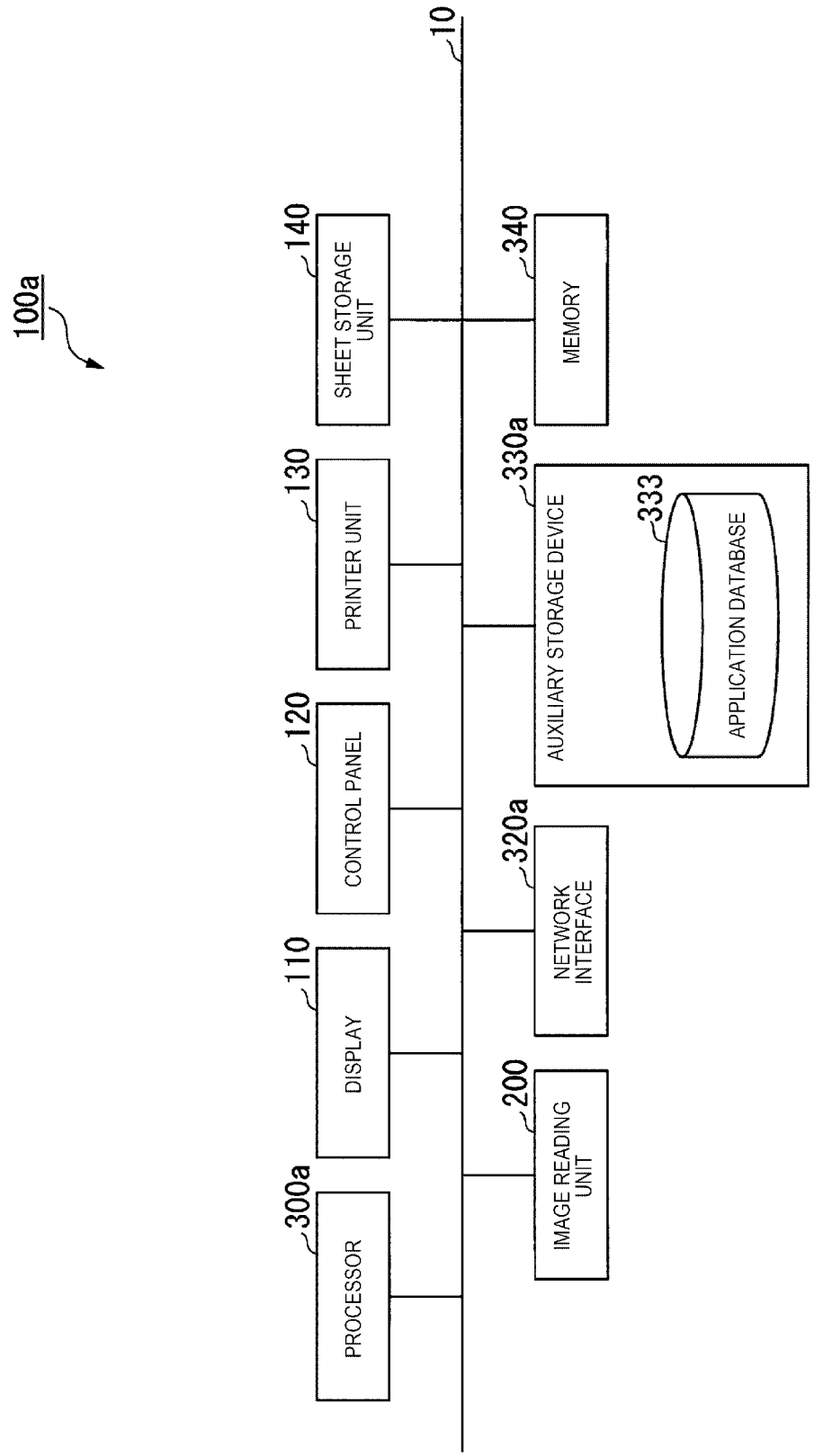
FIG. 18 is a block diagram illustrating a hardware configuration of an image processing apparatus according to the fifth embodiment.

FIG. 18 is a block diagram illustrating a hardware configuration of the image processing apparatus 100a according to the fifth embodiment.

The image processing apparatus 100a includes the display 110, the control panel 120, the printer unit 130, the sheet storage unit 140, the image reading unit 200, a processor 300a, a network interface 320a, an auxiliary storage device 330a, and the memory 340. Each of the components is connected to the system bus 10 so as to enable data communication between them.

The image processing apparatus 100a differs in configuration from the image processing apparatus 100 in that the processor 300a, the network interface 320a, and the auxiliary storage device 330a are included instead of the processor 300, the network interface 320, and the auxiliary storage device 330. The other configuration of the image processing apparatus 100a is the same as the configuration of the image processing apparatus 100. Accordingly, only the processor 300a, the network interface 320a, and the auxiliary storage device 330a will be described.

The processor 300a is, for example, a CPU. The processor 300a controls an operation of each component of the image processing apparatus 100a. The processor 300a performs various types of processing by executing a program.

The network interface 320a transmits and receives data to and from the image processing apparatus 100a. The network interface 320a operates as an input interface and receives data or an instruction transmitted from the image processing apparatus 100a. In addition, the network interface 320a operates as an output interface and transmits data to the image processing apparatus 100a.

The auxiliary storage device 330a is, for example, a hard disk or a solid state drive (SSD), and stores various data. The various data is, for example, digital data, a job, a job log, a usage quantity information database 331, a user information database 332, and an application database 333.

Figure 19:
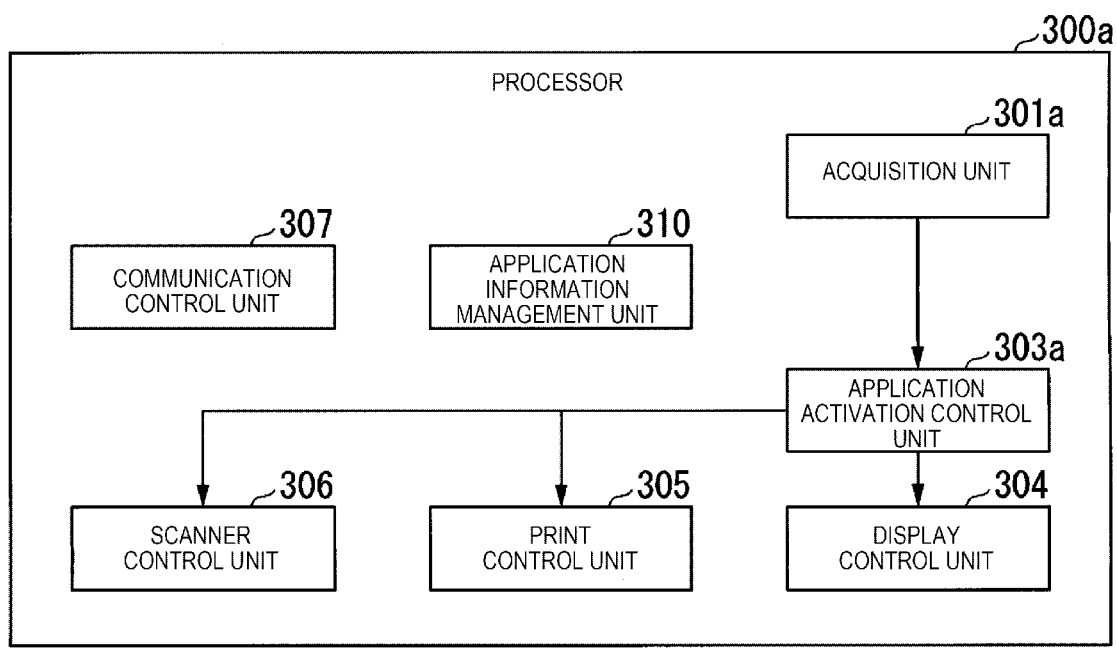
FIG. 19 is a schematic block diagram illustrating a functional configuration of a processor according to the fifth embodiment.

FIG. 19 is a schematic block diagram illustrating a functional configuration of the processor 300a according to the fifth embodiment. The processor 300a includes an acquisition unit 301a, the determination unit 302, an application activation control unit 303a, the display control unit 304, the print control unit 305, the scanner control unit 306, the communication control unit 307, and the application information management unit 310.

The processor 300a is different from the processor 300 in that the acquisition unit 301a and the application activation control unit 303a are included instead of the acquisition unit 301 and the application activation control unit 303, and in that the determination unit 302, the user information management unit 308, and the usage quantity management unit 309 are not included. The other configurations of the processor 300a are the same as the configurations of the processor 300. Accordingly, only the acquisition unit 301a and the application activation control unit 303a will be described.

The acquisition unit 301a acquires information on execution of an application. For example, the acquisition unit 301a acquires user information, an activation instruction of the application, and a determination result obtained by the management device 400. The determination result obtained from the management device 400 includes either an OK notification or an NG notification.

The application activation control unit 303a controls the activation of the application selected by a user, based on the determination result obtained by the acquisition unit 301a. For example, if the NG notification is included in the determination result, the application activation control unit 303 prohibits the activation of the application selected by the user. In addition, for example, if the OK notification is included in the determination result, the application activation control unit 303 activates the application selected by the user.

Figure 20:
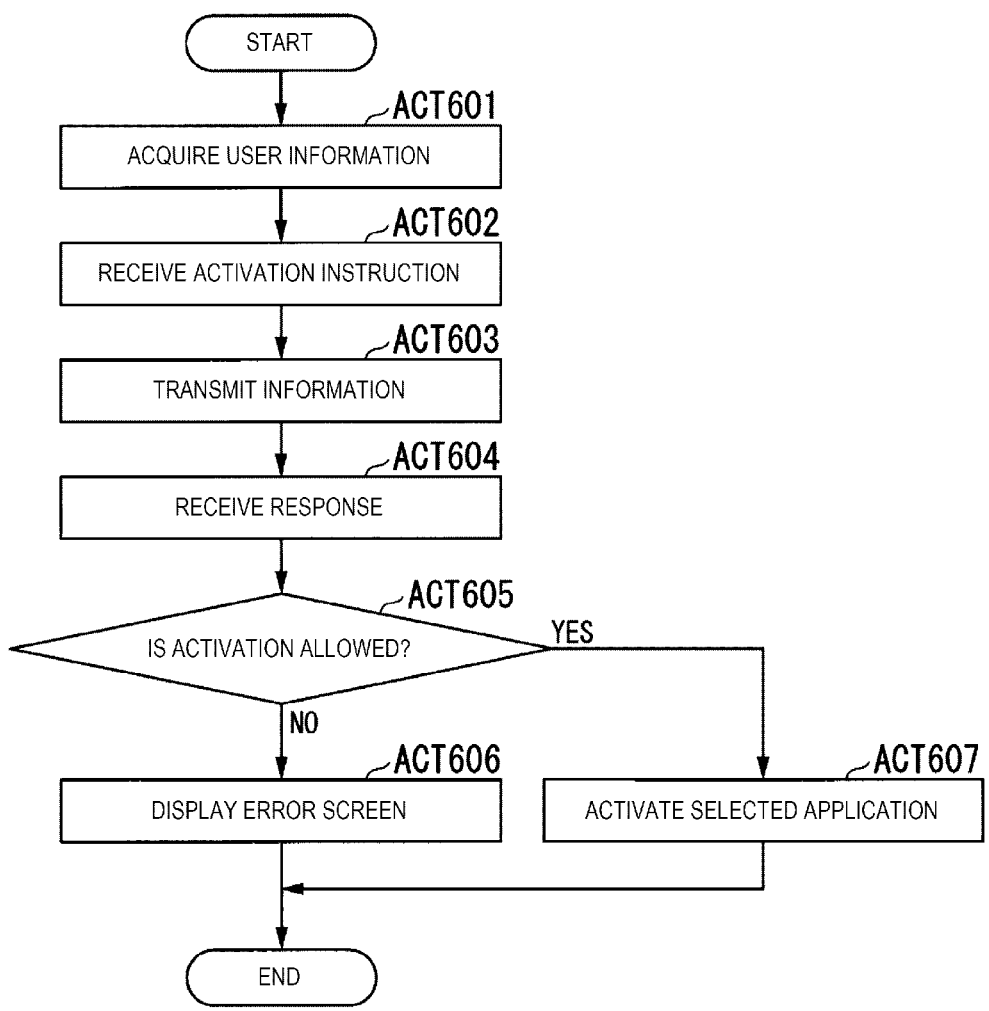
FIG. 20 is a flowchart illustrating a flow of processing of the image processing apparatus according to the fifth embodiment.

FIG. 20 is a flow chart illustrating a flow of processing of the image processing apparatus 100a according to the fifth embodiment.

The acquisition unit 301a acquires user information (ACT 601). The acquisition unit 301a outputs the acquired user information to the determination unit 302. The display 110 receives an input of an activation instruction of the application (ACT 602). That is, the display 110 receives selection of the application. If the application is selected, the display 110 outputs the selected application identification information to the processor 300a. The acquisition unit 301a acquires the application identification information output from the display 110, and outputs the acquired application identification information to the communication control unit 307.

The communication control unit 307 controls the network interface 320a to transmit the output application identification information and user identification information to the management device 400 (ACT 603). The network interface 320a receives a response including a determination result from the management device 400 (ACT 604). The network interface 320a outputs the received response to the application activation control unit 303a.

The application activation control unit 303 determines whether or not activation of the application is allowed based on the determination result included in the response. (ACT 605). Specifically, if the determination result is the OK notification, the application activation control unit 303 determines that the activation of the application is allowed. In addition, if the determination result is the NG notification, the application activation control unit 303 determines that activation of the application is not allowed.

If the activation of the application is not allowed (ACT 605: NO), the application activation control unit 303a prohibits the activation of the application. Then, the application activation control unit 303a instructs the display control unit 304 to display an error screen. The display control unit 304 displays the error screen on a screen of the display 110 (ACT 606).

Meanwhile, if the activation of the application is allowed (ACT 605: YES), the application activation control unit 303a activates the selected application (ACT 607).

Figure 21:
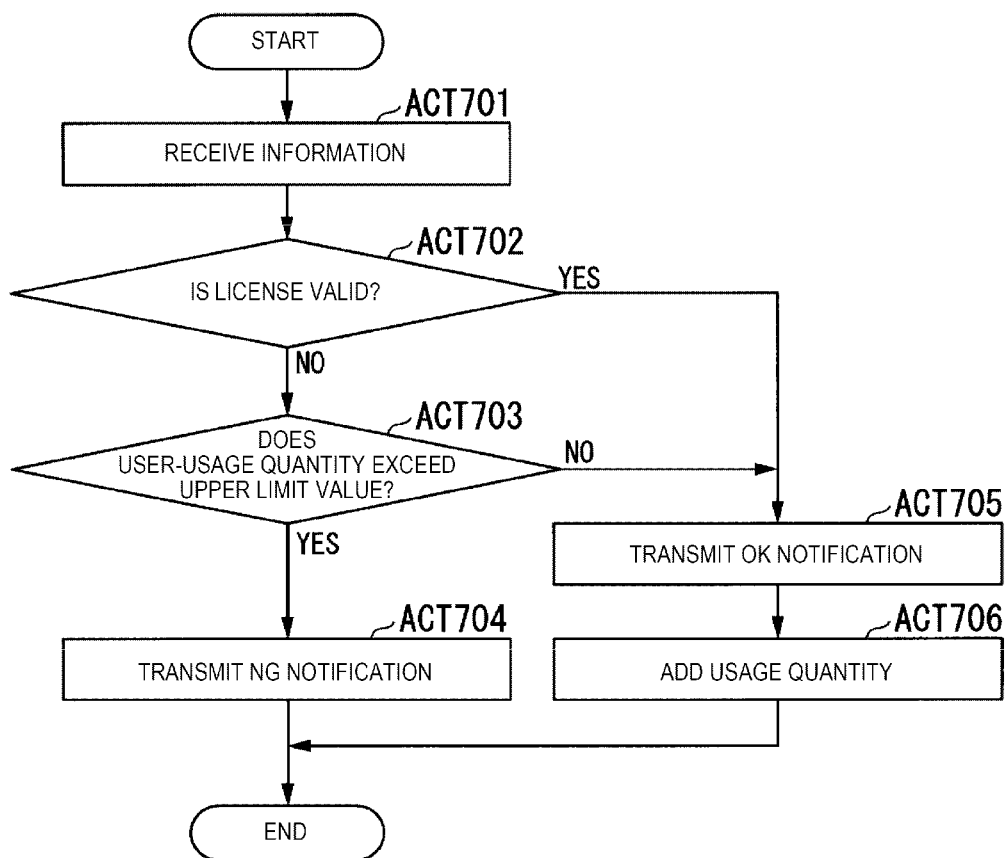
FIG. 21 is a flowchart illustrating a flow of processing of the management device according to the fifth embodiment.

FIG. 21 is a flowchart illustrating a flow of processing of the management device 400 according to the fifth embodiment.

The communication unit 410 receives the information (the application identification information and the user identification information) transmitted from the image processing apparatus 100a (ACT 701). The communication unit 410 outputs the received information to the control unit 420. The determination unit 422 determines whether or not a license of the application identified by the application identification information is valid with reference to the application database 433 (ACT 702). If the license of the application is not valid (ACT 702: NO), the determination unit 422 determines whether or not a user usage quantity exceeds an upper limit value (ACT 703).

If the user usage quantity exceeds the upper limit value (ACT 703: YES), the determination unit 422 outputs an NG notification to the communication control unit 421. If the NG notification is input, the communication control unit 421 generates a response including the NG notification. Then, the communication control unit 421 controls the communication unit 410 to transmit the generated response to the image processing apparatus 100a (ACT 704).

If the license of the application is valid (ACT 702: YES), the determination unit 422 outputs an OK notification to the communication control unit 421. If the user usage quantity does not exceed the upper limit value (ACT 703: NO), the determination unit 422 outputs the OK notification to the communication control unit 421. If the OK notification is input, the communication control unit 421 generates a response including the OK notification. Then, the communication control unit 421 controls the communication unit 410 to transmit the generated response to the image processing apparatus 100a (ACT 705). Thereafter, the usage quantity management unit 424 adds the usage quantity of the MFP function in the executed application (ACT 706).

According to the image processing system of the fifth embodiment configured as described above, it is possible to effectively use an application whose license is not valid. The management device 400 determines whether or not the application is to be activated based on usage quantity of the MFP function of a user in the image processing apparatus 100a, and transmits the determination result to the image processing apparatus 100a. The image processing apparatus 100a controls the activation of the application in accordance with the notification included in the determination result received from the management device 400. In this way, the image processing apparatus 100a prohibits activation of the application according to the usage quantity (for example, the number of used sheets) of the MFP function employed by the application, not by a predefined time period. As a result, for so long as an application whose license is not valid is not used, the application whose license is not valid still can be used. Accordingly, it is possible to effectively use the application whose license is not valid.

In addition, the image processing apparatus 100a does not need to determine whether or not the application is activated. Accordingly, it is possible to reduce a processing load by the image processing apparatus 100a.

Hereinafter, a modification example of the image processing system will be described.

One of the plurality of image processing apparatuses 100a may include a function of the management device 400 and may be configured to operate as the management device 400.

The management device 400 may be configured to manage the activation of the application based on the user usage quantity and the trial period. Hereinafter, processing when the management device 400 manages the activation of the application based on the user usage quantity and the trial period will be described with reference to FIG. 22.

Figure 22:
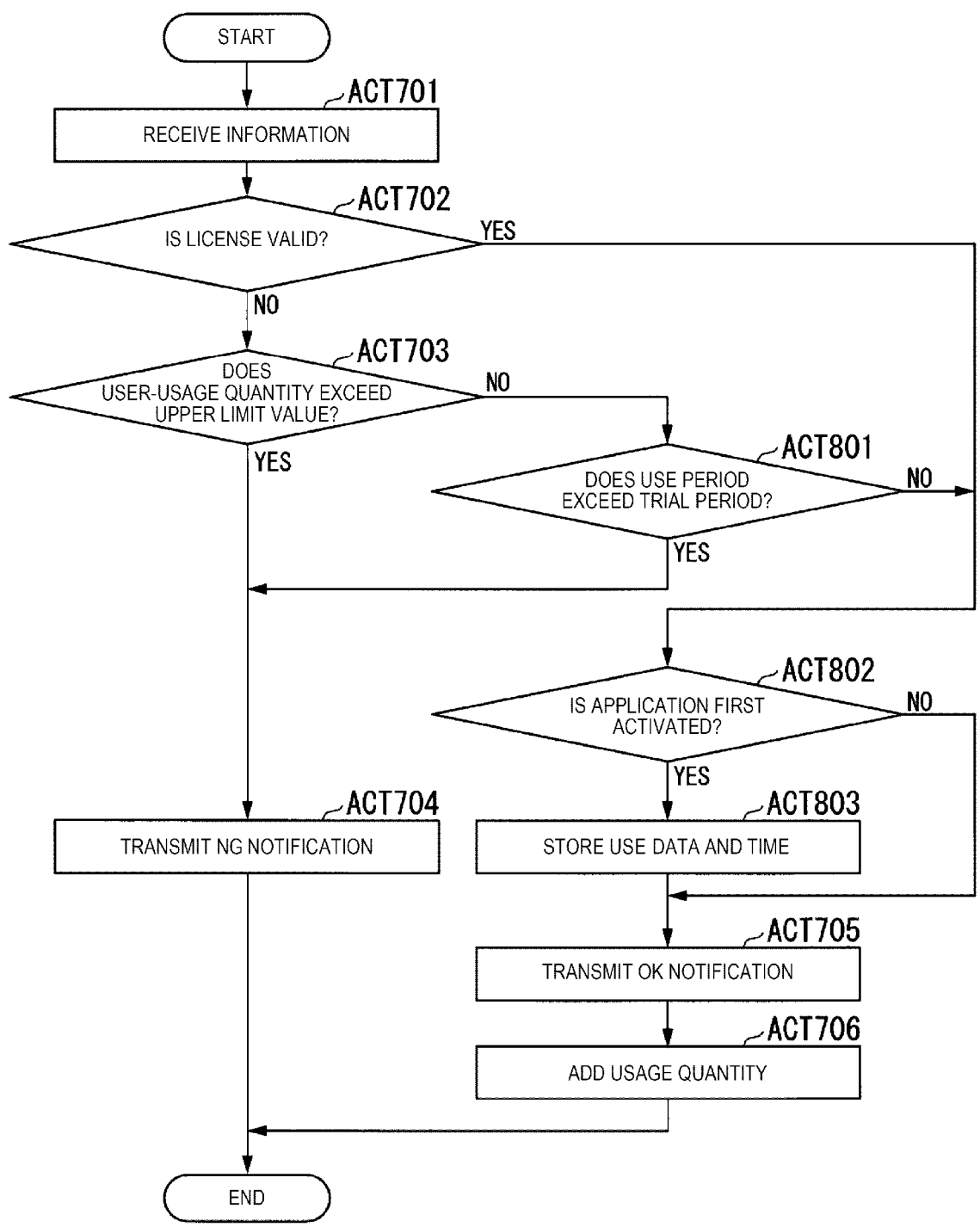
FIG. 22 is a flowchart illustrating a flow of processing when the management device manages activation of an application based on a user usage quantity and a trial period.

FIG. 22 is a flowchart illustrating a flow of processing when the management device 400 manages the activation of the application based on the user usage quantity and the trial period. In FIG. 22, processing which is the same as in FIG. 21 is denoted by the same reference numeral as in FIG. 21, and description thereof will not be repeated.

If the user usage quantity does not exceed the upper limit value (ACT 703: NO), the determination unit 422 next determines whether or not the use period exceeds the trial period of the selected application (ACT 801). Specifically, the determination unit 422 first acquires information on the trial period of the application identified by the application identification information and the date when the application is activated with reference to the application database 433. At this time, if the application identified by the application identification information is not activated at least once after being installed, information on the date and time when the application is activated not acquired.

Next, the determination unit 422 compares a use period from the date and time when the application is activated to the current date and time with the trial period. Then, if the use period exceeds the trial period, the determination unit 422 determines that the use period exceeds the trial period of the application. In addition, if the use period does not exceed the trial period, the determination unit 422 determines that the use period does not exceed the trial period of the application. If the use period exceeds the trial period of the application (ACT 801: YES), the management device 400 performs processing of ACT 704.

If the use period does not exceed the trial period of the application (ACT 801: NO), the determination unit 422 determines whether or not the application identified by the application identification information is being activated for the first time (ACT 802). Specifically, if information on the date and time when the application is activated is stored, the determination unit 422 determines that the application is not being activated for the first time. Meanwhile, if the information on the date and time when the application is activated is not stored, the determination unit 422 determines that the application is being activated for the first time. If the application is not being activated for the first time (ACT 802: NO), the management device 400 performs the processing of ACT 705 and subsequent processing.

Meanwhile, if the application is being activated for the first time (ACT 802: YES), the application information management unit 425 stores the date and time when the application is used in the application database 433 (ACT 803). For example, the application information management unit 425 stores the date and time when the application is activated in association with the application identification information, as the date and time when application is used. Thereafter, the management device 400 performs the processing of ACT 705 and subsequent processing.

By using the configuration described above, the management device 400 can activate the application even if the user usage quantity exceeds the upper limit value, if the user usage quantity does not exceed the trial period. Thereby, even for a user who uses many MFP functions in a short period of time, the application can be effectively used during the trial period. Accordingly, it is possible to improve convenience.

FIG. 22 illustrates a configuration in which the management device 400 transmits an OK notification when the user usage quantity does not exceed the upper limit value and does not exceed the trial period, but embodiments are not limited to this. For example, the management device 400 may be configured to transmit the OK notification even if the user usage quantity exceeds the upper limit value, if the user usage quantity does not exceed the trial period. In addition, for example, the management device 400 may be configured to transmit the OK notification even if the user usage quantity exceeds the trial period, if the user usage quantity does not exceed the upper limit value. In addition, for example, the application activation control unit 303 may be configured to transmit an NG notification if the user usage quantity exceeds the upper limit value or the use period exceeds the trial period.

The management device 400 may be configured to determine whether or not the application usage quantity or the total usage quantity, which is used instead of the user usage quantity, exceeds the upper limit value. Since specific processing thereof is the same as the processing of the image processing apparatus 100 according to the second embodiment or the image processing apparatus 100 according to the third embodiment, description thereof will not be repeated. In addition, the management device 400 may be configured to determine whether or not the usage quantity set in the image processing apparatus 100a exceeds the upper limit value. In such a configuration, the image processing apparatus 100a transmits information of the usage quantity set in the image processing apparatus to the management device 400, in addition to the application identification information and the user identification information. The determination unit 422 of the management device 400 specifies the usage quantity which is used for determination, based on the information of the usage quantity set in the image processing apparatus 100a. Then, the determination unit 422 determines whether or not the specified usage quantity exceeds the upper limit value.

The determination unit 422 included in the management device 400 may be configured to total up the usage quantity stored in the usage quantity information database 431 for each image processing apparatus 100a and determine whether or not the total usage quantity exceeds a threshold value. Specifically, first, the determination unit 422 first refers to the usage quantity information database 431 for each image processing apparatus 100a. Next, the determination unit 422 acquires information of a user identified by the user identification information transmitted from the image processing apparatus 100a, from each usage quantity information database 431. For example, the determination unit 422 acquires one of the usage quantity for each MFP function, the usage quantity for each application, and the total usage quantity, for each user identified by the user identification information. Acquiring either the usage quantity for each MFP function, the usage quantity for each application, or the total usage quantity may be set in advance.

Next, the determination unit 422 adds up the usage quantity acquired from the usage quantity information database 431 and calculates a total value between the plurality of image processing apparatuses 100a. For example, the determination unit 422 acquires the usage quantity of the MFP function which is used by the application selected by a user from each usage quantity information database 431, and calculates the total value between the plurality of image processing apparatuses 100a. Then, the determination unit 422 compares the total value with the upper limit value, thereby, determining whether or not the usage quantity of the user exceeds the upper limit value.

By configuring as described above, the image processing apparatus 100a prohibits activation of the application if the usage quantity of one user or the total value of the usage quantity of the plurality of image processing apparatuses 100a reaches the upper limit value. That is, in the usage quantity of one image processing apparatus 100a, even if the usage quantity does not reach the upper limit value, use of the application is prohibited. Thereby, it is possible to prohibit that one user from activating the application. However, other users still can use the MFP function with the application on a trial basis.

Modification examples common to the first to fifth embodiments will be described.

In the respective embodiments described above, an image processing apparatus is described as an example, but an image forming apparatus that forms an image on a sheet can also be adopted in the same manner.

The display control unit 304 may cause the display 110 to display an application button of an application exceeding usage quantity in a display aspect different from an application button of an application which does not exceed the usage quantity. In such a case, the display control unit 304 changes a display mode for each user identified by the user identification information acquired by the acquisition unit 301 (or the acquisition unit 301a). For example, the display control unit 304 may perform displaying in a grayout mode such that the application button of the application exceeding the usage quantity cannot be selected, or may display that the application button cannot be selected. In addition, the display control unit 304 may be configured such that the application button of the application exceeding the usage quantity is not displayed on a screen of the display 110.

In addition, the display control unit 304 may cause the display 110 to display information on the remaining usage quantity for each MFP function by the application, for each user. Specifically, first, if a display request of information on the remaining usage quantity is made from the user, the display control unit 304 first acquires user identification information acquired by the acquisition unit 301 (or the acquisition unit 301a). Next, the display control unit 304 calculates the remaining usage quantity of the user of the user identification information for each MFP function with reference to the usage quantity information database 331 and the application database 333. Then, the display control unit 304 causes the display 110 to display information on the remaining usage quantity calculated for each MFP function. If the user identification information is acquired without the display request, the display control unit 304 may cause the display 110 to display the information on the remaining usage quantity for each MFP function by the application. In this case, the display control unit 304 causes the display 110 to display the information on the remaining usage quantity for each MFP function by the application on the screen illustrated in FIG. 3.

By configuring as described above, the remaining usage quantity can be presented to a user. Thus, the user can grasp how much he can use the MFP function by the application.

According to the image processing apparatus 100 of at least one of the embodiments described above, it is possible to effectively use an applications whose license is not valid, by including an application activation control unit that allows use of the MFP function by the application whose license is not valid, until a usage quantity exceeds an upper limit value, based on the usage quantity of the MFP function.

A part of functions of the image processing apparatus 100, the image processing apparatus 100a, and the management device 400 according to the above-described embodiments may be realized by a computer. In that case, a program for realizing this function is recorded on a computer readable recording medium. Then, the program recorded on the recording medium on which the above-described program is recorded may be read and executed by a computer system. It is assumed that the "computer system" referred to here includes hardware such as an operating system and a peripheral apparatus. In addition, the "computer readable recording medium" refers to a portable medium, a storage device, or the like. The portable medium is a flexible disk, a magneto-optical disk, a ROM, a CD-ROM, and the like. In addition, the storage device is a hard disk built in the computer system or the like. Furthermore, the "computer readable recording medium", which dynamically holds a program for a short time, such as a communication line when a program is transmitted via the communication line. The communication line is a network such as the Internet or a telephone line. In addition, the "computer readable recording medium" may be a volatile memory inside a computer system serving as a server or a client. The volatile memory holds a program for a certain period of time. In addition, the program may realize a part of the above-described functions. In addition, the program may be realized by combining the above-described function with a program previously recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus configured to execute an application that employs a function of the image processing apparatus, comprising:
    a storage unit in which a usage quantity is stored for each of a plurality of users, wherein each usage quantity is one of a number of sheets of paper used by the function and a number of times the function has been used; and
    a processor configured to:
        determine whether a license for the application is valid; and
        if the license is determined to be not valid, control activation of the application for a user, based on the usage quantity for the function stored in the storage unit for the user.

2. The apparatus according to claim 1, wherein the storage unit stores an application package that includes the application and a threshold value for the usage quantity for the function employed by the application, and the processor controls activation of the application based on whether the usage quantity for the function stored in the storage unit for the user exceeds the threshold value, when receiving an application activate instruction from the user.

3. The apparatus according to claim 1, wherein the processor is configured to control activation of the application for the user further based on a total usage quantity for the function, the total usage quantity corresponding to usage of the application by all of the plurality of users of the image processing apparatus who have selected the application for activation.

4. The apparatus according to claim 1, wherein the processor is configured to control activation of the application further based on a usage period of the application.

5. The apparatus according to claim 4, wherein the processor is configured to determine the usage period as a time period that has elapsed since the application was activated for the first time.

6. The apparatus according to claim 5, wherein the processor is configured to prohibit activation of the application if the usage quantity for the function exceeds a threshold value and the usage period of the application exceeds a threshold time period.

7. The apparatus according to claim 6, wherein the storage unit stores metadata for the application which indicates whether the activation of the application is to be prohibited based on the usage quantity for the function stored in the storage unit for the user.

8. An image processing system comprising:
    a plurality of image processing apparatuses, each configured to execute an application that employs a function; and
    a management device configured to manage the plurality of image processing apparatuses,
    wherein the management device includes:
        a storage unit in which a usage quantity for the function is stored for each of a plurality of users, wherein each usage quantity is one of a number of sheets of paper used by the function and a number of times the function has been used, and
        a processor configured to:
            in response to a request to activate the application received from one of the plurality of image processing apparatuses, determine whether a license for the application is valid, and
            if the license of the application is determined to be not valid, determine whether the usage quantity for the function stored in the storage unit for a user exceeds a threshold value, and
    wherein each of the image processing apparatuses includes:
        a processor configured to control activation of the application based on determination results returned by the management device in response to the request to activate the application.

9. The system according to claim 8, wherein the storage unit stores an application package that includes the application and the threshold value for the usage quantity for the function for the plurality of users, and the function comprises one of a copy function, a scan function, a print function, and a fax transmission function.

10. The system according to claim 9, wherein the processor of each image processing apparatus is configured to control activation of the application for the user further based on a total usage quantity for the function, the total usage quantity corresponding to usage of the application by all of the plurality of users of the image processing apparatus who have selected the application for activation.

11. The system according to claim 9, wherein the processor of each image processing apparatus is configured to control activation of the application for the user based on a total usage quantity of the function by all of the plurality of users of the image processing system.

12. The system according to claim 8, wherein the processor of each image processing apparatus is further configured to control activation of the application based on a usage period of the application.

13. The system according to claim 12, wherein the processor of each image processing apparatus is configured to determine the usage period as a time period that has elapsed since the application was activated for the first time.

14. The system according to claim 13, wherein the processor of each image processing apparatus is configured to prohibit activation of the application if the usage quantity of the function employed by the application exceeds the threshold value and the usage period of the application exceeds a threshold time period.

15. The system according to claim 14, wherein the storage unit stores metadata for the application which indicates whether the activation of the application is to be prohibited based on the usage quantity for the function employed by the application.

16. A control method for activating an application in an image processing apparatus, wherein the application employs a function of the image processing apparatus, the method comprising:

storing a usage quantity for the function for each of a plurality of users of the image processing apparatus, wherein each usage quantity is one of a number of sheets of paper used by the function and a number of times the function has been used;

determining whether a license for an application is valid, and if the license is determined to be not valid, determining whether the stored usage quantity for the function employed by the application selected by a user for activation exceeds a threshold quantity; and controlling activation of the application based on whether the usage quantity of the function by the user exceeds the threshold quantity.

17. The method according to claim 16, wherein the usage quantity for the function is tracked for each of the plurality of users of the image processing apparatus, and the usage quantity for the function selected by the user for activation that is compared against the threshold quantity is the tracked usage quantity for the user who selected the application for activation.

18. The method according to claim 16, wherein the controlling activation further comprises:

controlling activation of the application further based on a usage period of the application.

19. The method according to claim 18, further comprising:

determining the usage period as a time period that has elapsed since the application was activated for the first time.

* * * * *